(12) United States Patent
Hunstable

(10) Patent No.: US 11,777,386 B2
(45) Date of Patent: *Oct. 3, 2023

(54) SYSTEM AND METHOD FOR AN ELECTRIC MOTOR/GENERATOR WITH A MULTI-LAYER STATOR/ROTOR ASSEMBLY

(71) Applicant: Linear Labs, Inc., Fort Worth, TX (US)

(72) Inventor: Fred E. Hunstable, Granbury, TX (US)

(73) Assignee: Linear Labs, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,770

(22) Filed: Feb. 23, 2022

(65) Prior Publication Data
US 2023/0006523 A1 Jan. 5, 2023

Related U.S. Application Data

(63) Continuation of application No. 16/997,281, filed on Aug. 19, 2020, now Pat. No. 11,277,062.

(60) Provisional application No. 62/889,022, filed on Aug. 19, 2019.

(51) Int. Cl.
| | | |
|---|---|---|
| H02K 21/24 | (2006.01) | |
| H02K 21/22 | (2006.01) | |
| H02K 3/18 | (2006.01) | |
| H02K 3/52 | (2006.01) | |
| H02K 1/14 | (2006.01) | |
| H02K 16/02 | (2006.01) | |
| H02K 1/2796 | (2022.01) | |

(52) U.S. Cl.
CPC ........... *H02K 21/227* (2013.01); *H02K 1/145* (2013.01); *H02K 1/2796* (2022.01); *H02K 3/18* (2013.01); *H02K 3/525* (2013.01); *H02K 16/02* (2013.01); *H02K 2201/12* (2013.01)

(58) Field of Classification Search
CPC ....... H02K 21/24; H02K 1/2793; H02K 16/00
See application file for complete search history.

(56) References Cited

U.S. PATENT DOCUMENTS 11,277,062 B2 * 3/2022 Hunstable .............. H02K 16/02

\* cited by examiner

*Primary Examiner* — Dang D Le
(74) *Attorney, Agent, or Firm* — Run8 Patent Group, LLC; Peter Miller; Alexander Rodriguez

(57) ABSTRACT

Disclosed are various embodiments for a new and improved electric motor/generator including a toroidal magnetic cylinder centered on the longitudinal axis, and a coil assembly including a first coil assembly support positioned within the toroidal magnetic cylinder, and a second coil assembly support positioned within the toroidal magnetic cylinder.

20 Claims, 23 Drawing Sheets

SYSTEM AND METHOD FOR AN ELECTRIC MOTOR/GENERATOR WITH A MULTI-LAYER STATOR/ROTOR ASSEMBLY

RELATED APPLICATIONS

This application is a continuation of U.S. patent application Ser. No. 16/997,281, filed Aug. 19, 2020, entitled "A System and Method for an Electric Motor/Generator with a Multi-Layer Stator/Rotor Assembly," which claims the benefit of U.S. provisional patent application 62/889,022, filed Aug. 19, 2019, entitled "A System and Method for an Electric Motor/Generator with a Multi-Layer Stator/Rotor Assembly," the disclosures of which are incorporated by reference herein for all purposes.

TECHNICAL FIELD

The invention relates in general to a new and improved electric motor/generator, and in particular to an improved system and method for producing rotary motion from an electromagnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

In a traditional electric motor, a central core of tightly wrapped current carrying material creates magnetic poles (known as the rotor) spins or rotates at high speed between the fixed poles of a magnet (known as the stator) when an electric current is applied. The central core is typically coupled to a shaft which will also rotate with the rotor. The shaft may then be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature or rotor and the stationary components are called the stator or stators.

In most conventional motors, both linear and rotating, enough power of the proper polarity must be pulsed at the right time to supply an opposing (or attracting) force at each pole segment to produce a particular torque. In conventional motors at any given instant only a portion of the coil pole pieces is actively supplying torque.

With conventional motors, a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM. However output is a sinusoidal output which inherently has losses similar to that of conventional electric motors.

Specifically, the pulsed time varying magnetic fields produces undesired effects and losses, i.e. iron hysteresis losses, counter-EMF, inductive kickback, eddy currents, inrush currents, torque ripple, heat losses, cogging, brush losses, high wear in brushed designs, commutation losses and magnetic buffeting of permanent magnets. In many instances, complex controllers are used in place of mechanical commutation to address some of these effects.

Additionally, in motors or generators, some form of energy drives the rotation and/or movement of the rotor. As energy becomes more scarce and expensive, what is needed are more efficient motors and generators to reduce energy consumption, and hence costs.

SUMMARY

In response to these and other problems, there is presented various embodiments disclosed in this application, including methods and systems of increasing flux density by permanent magnet manipulation using multiple magnetic tunnels. Disclosed are various embodiments for a motor/generator comprising: a plurality of coils radially positioned about a coil assembly, a plurality of magnetic tunnels forming a relative rotational path for the coil assembly, wherein the all of plurality of magnets forming each magnetic tunnel have like poles facing inward toward the interior of the magnetic tunnel or facing outward away from the interior of the magnetic tunnel such that each magnetic field of any magnetic tunnel is of an opposite polarity to the magnetic field of an adjacent magnetic tunnel.

These and other features, and advantages, will be more clearly understood from the following detailed description taken in conjunction with the accompanying drawings. It is important to note the drawings are not intended to represent the only aspects of the invention.

DETAILED DESCRIPTION

Specific examples of components and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for orientation of components in the figures. The directions should not be read to imply actual directions used in any resulting invention or actual use. Under no circumstances, should such directions be read to limit or impart any meaning into the claims.

Motor/Generator Element and Back Iron Circuit

Figure 1A:
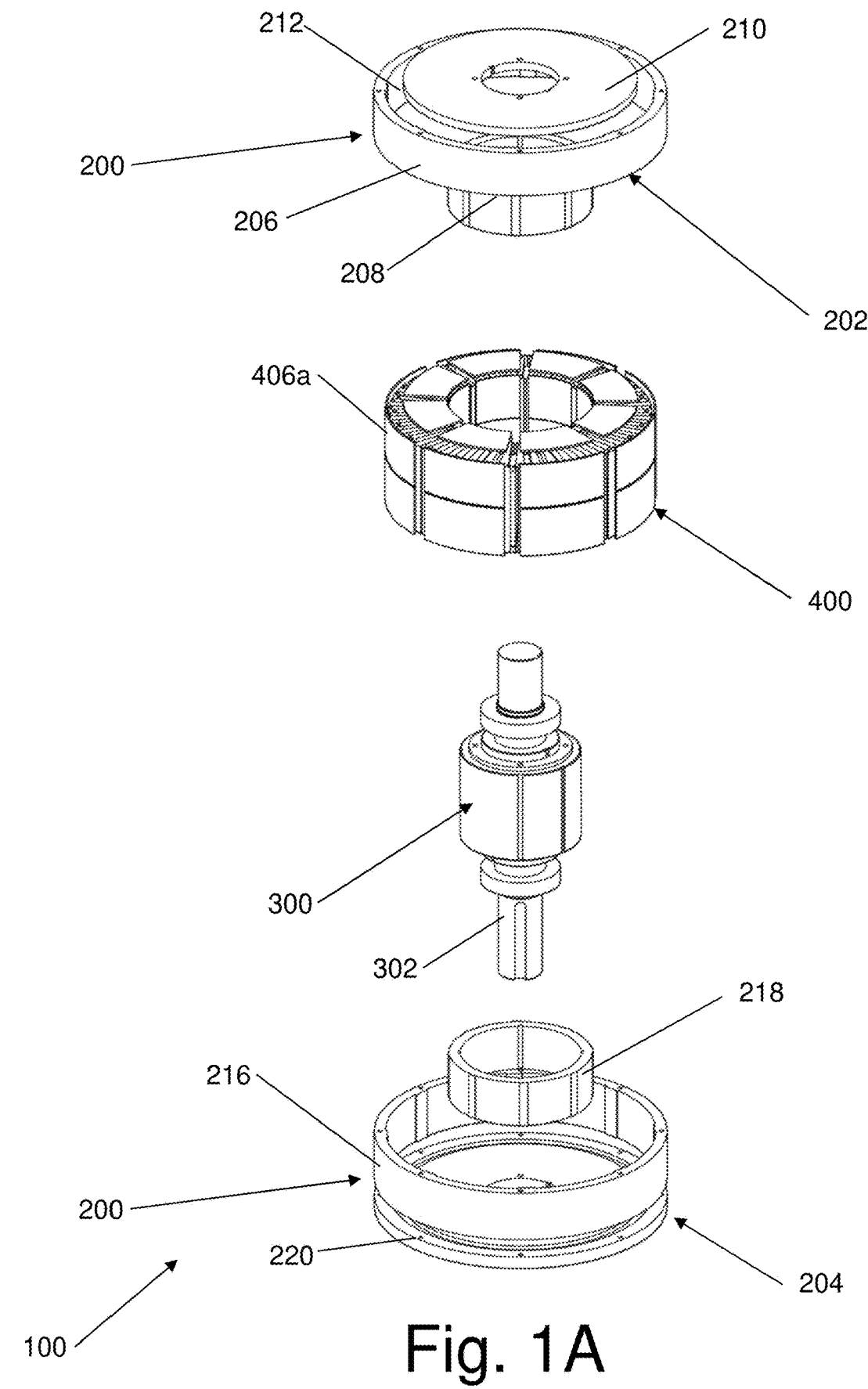
FIG. 1A is an exploded view of one embodiment of a motor/generator component according to certain aspects of the present disclosure.

FIG. 1A is an exploded isometric view of a motor/generator element 100 illustrating a first portion 202 of a back iron circuit 200, a second portion 204 of the back iron circuit 200, a rotor hub 300 with a shaft 300, and a magnetic disc assembly 400.

The back iron circuit 200 is theoretically optional. It serves to strengthen magnetic elements (described below) and constrain the magnetic circuit to limit reluctance by removing or reducing the return air path. The first portion 202 of the back iron circuit 200 comprises a first outer cylindrical wall 206 made of a suitable back iron material as described below. When the motor/generator element 100 is assembled, a first inner cylindrical wall 208 is concentrically positioned within the first outer cylindrical wall 206. A first flat side wall 210 which is also made of back iron material is positioned longitudinally next to the first outer cylindrical wall 206 and the first inner cylindrical wall 208.

A second portion of the back iron circuit 204 includes a second inner cylinder wall 218 concentrically positioned within a second outer cylindrical wall 216 (when the motor/generator element 100 is assembled). A second flat side wall 220 of back iron material is positioned longitudinally next to the second outer cylindrical wall 216 and the second inner cylindrical wall 218. In certain embodiments, the second inner cylinder wall 218 and second outer cylinder wall 216 have a plurality of longitudinal grooves or recesses sized to accept and support a plurality of magnets as described below with respect to FIG. 1B.

For purposes of this application the term "back iron" may refer to iron, an iron alloy, any ferrous compound or alloy, such as stainless steel, any nickel or cobalt alloy, laminated steel, laminated silicon steel, or any laminated metal comprising laminated sheets of such material, or a sintered specialty magnetic powder.

In certain embodiments, there is a circumferential or radial gap or slot 212 between the first outer wall 206 and the first side wall 210. The circumferential gap 212 may allow for the passage of a support structure, control wires and electrical conductors (not shown) into the magnetic disc assembly 400 as well as for heat dissipation and/or a thermal control medium. In other embodiments, the gap 212 may be defined within the first outer wall 206 or between the first outer wall 206 and the second outer wall 216. In yet other embodiments, the gap 212 may be located in other locations to optimize performance. For instance, in certain embodiments, the gap 212 may be located between the first inner wall 208 and second inner wall 218

Figure 1B:
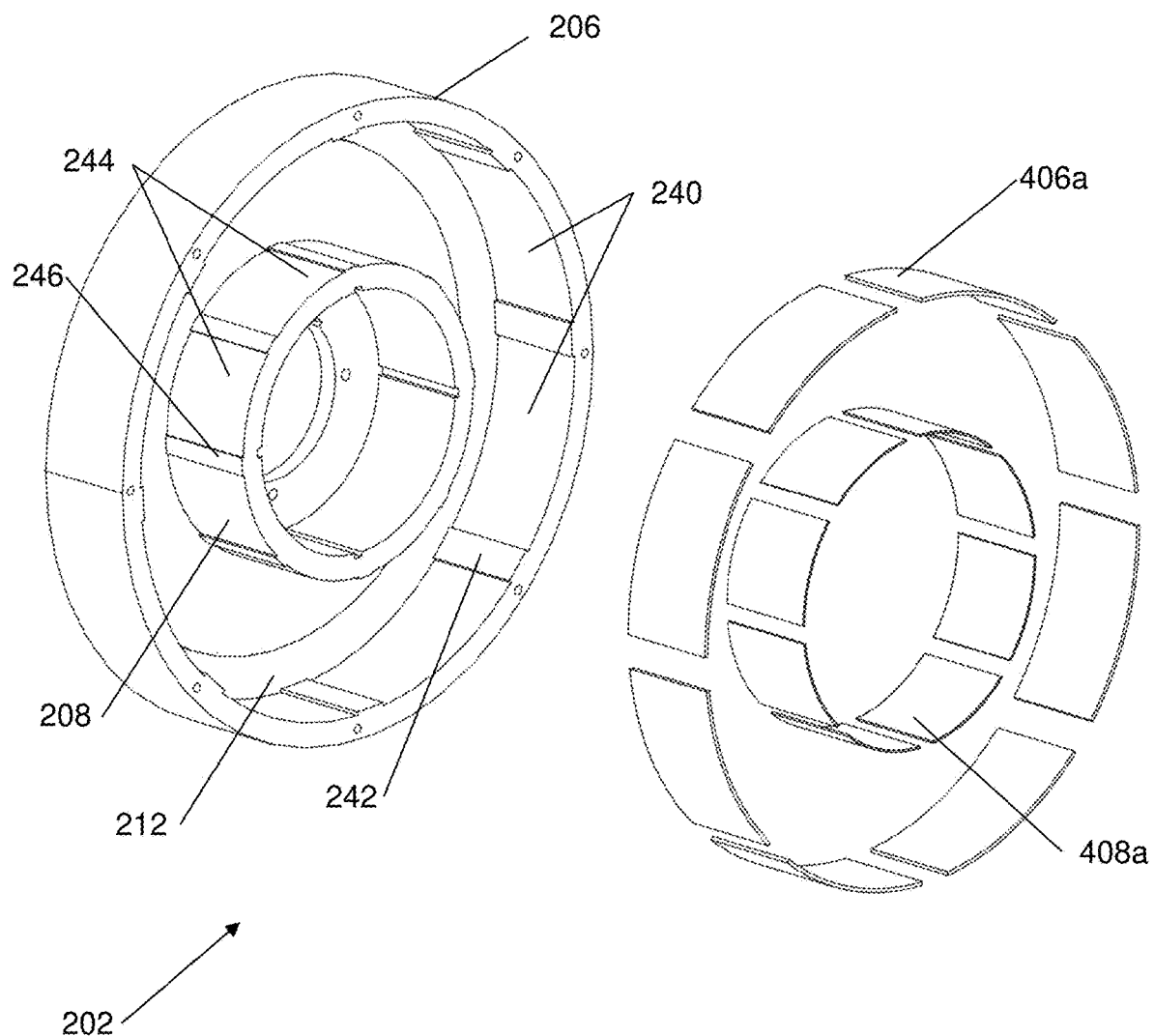
FIG. 1B is a detailed exploded view of certain elements of the motor/generator component of FIG. 1A.

FIG. 1B is a detailed isometric view of the first portion 202 of the back iron circuit illustrating the first inner cylindrical wall 208, positioned within the first outer cylinder wall 206. A plurality of inner longitudinal grooves or slots 240 are defined and radially spaced around an inner surface 242 of the first outer cylinder wall 206. Similarly, a plurality of outer longitudinal grooves 244 are defined and radially spaced around an outer surface 246 of the first inner cylinder wall 208.

As will be described in detail below, a plurality of outer magnets forming a portion of an outer magnetic wall 406a (from the magnetic disc 400 discussed below) are sized to fit within the plurality of inner longitudinal grooves 240. Similarly, a plurality of inner magnets forming a portion of an inner magnetic wall 408a are sized to fit within the plurality of outer longitudinal grooves 244 defined within the outer surface 246 of the first inner cylinder wall 208. Similar or identical grooves or surfaces are found in the second portion 204 of the back iron circuit 200, and thus, will not be separately described in this disclosure.

Turning back to FIG. 1A, in this embodiment, when the motor/generator element 100 is assembled, the first portion 202 of the back iron circuit 200 and the second portion 204 of the back iron circuit physically support and surround the magnetic disc assembly 400. In the illustrative embodiment, the first inner wall 208 and second inner wall 218 also radially surrounds and is radially coupled to the rotor hub 300. In certain embodiments, the rotor hub 300 positions and structurally supports certain components of the back iron circuit 200 (which in turn, supports the magnetic components of the magnetic disc 400).

Magnetic Disc Assembly

Figure 2:
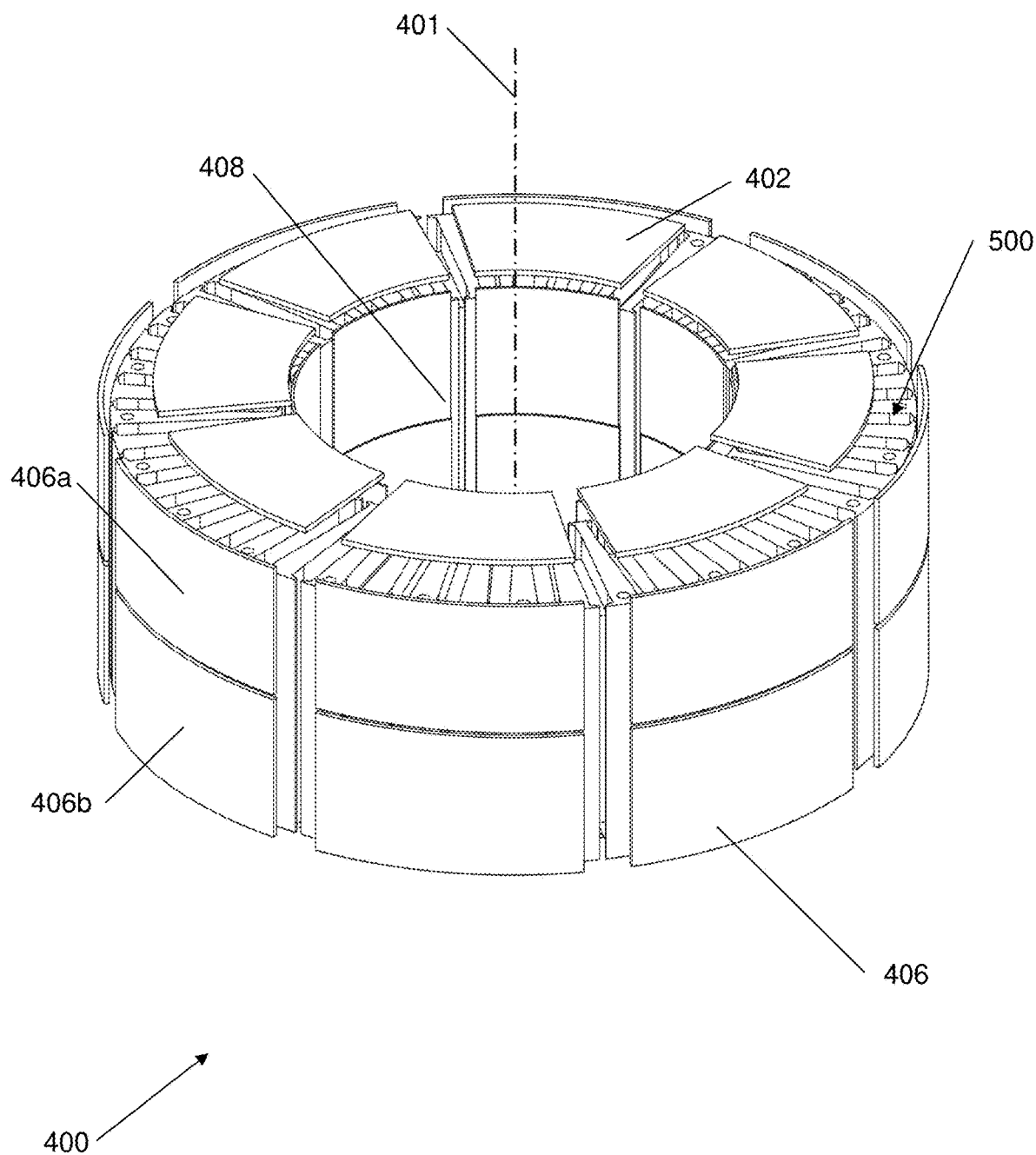
FIG. 2 is a detailed isometric view of a magnetic cylinder/stator element or magnetic cylinder/rotor element of the motor/generator component illustrated in FIG. 1A.
Figure 3:
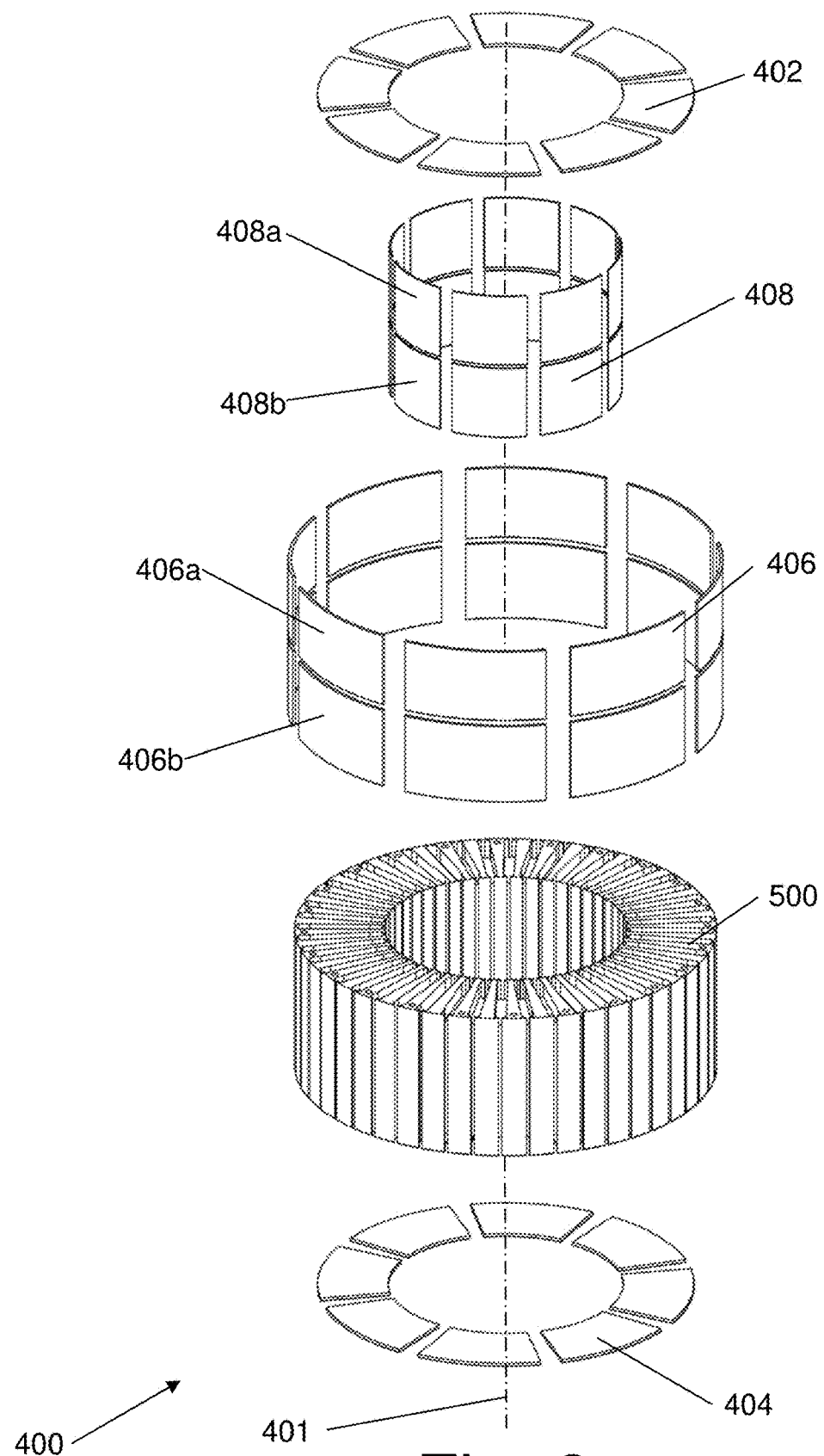
FIG. 3 is an exploded view of the magnetic cylinder/stator element or the magnetic cylinder/rotor element of FIG. 2.

FIG. 2 is a detailed isometric view of the assembled magnetic disc assembly 400 of FIG. 1A. FIG. 3 is an exploded view of the magnetic disc assembly 400. In the embodiment illustrated in FIGS. 2 and 3, with respect to a longitudinal axis 401, there is a top or first axial or side wall of magnets 402. Similarly there is an opposing bottom or second axial or side wall of magnets 404. An outer cylindrical wall of magnets 406 is longitudinally positioned between the first axial or side wall 402 and the second axial or side wall of magnets 404. In certain embodiments, the outer cylindrical wall of magnets 406 comprises two pluralities of magnets 406a and 406b which are longitudinally separated from each other sized to couple with the back iron walls 206 and 216, as described above with respect to FIG. 1B.

An inner cylindrical wall of magnets 408 is also longitudinally positioned between the first axial or side wall 402 and the second axial or side wall of magnets 404 and concentrically positioned within the outer cylindrical wall of magnets 406. In certain embodiments, the inner cylindrical wall of magnets 408 comprises two pluralities of magnets 408a and 408b which are longitudinally separated from each other and sized to couple with the back iron walls 208 and 218, as described above in reference to FIG. 1B.

In certain embodiments, the magnets forming the axial side walls 402-404 and cylindrical walls 408-406 discussed herein may be made of out any suitable magnetic material, such as: neodymium, Alnico alloys, ceramic permanent magnets, or electromagnets. The exact number of magnets or electromagnets will be dependent on the required magnetic field strength or mechanical configuration. The illustrated embodiment is only one way of arranging the magnets, based on certain commercially available magnets. Other arrangements are possible, especially if magnets are manufactured for this specific purpose.

Coil Assembly

When the motor/generator 100 is assembled, a coil assembly 500 is concentrically positioned between the outer cylinder wall 406 and the inner cylinder wall 408. The coil assembly 500 is also longitudinally positioned between the first axial side wall 402 and the second axial side wall 404. In certain embodiments, the coil assembly 500 may be a stator. In yet other embodiments, the coil assembly 500 may be a rotor.

Figure 4A:
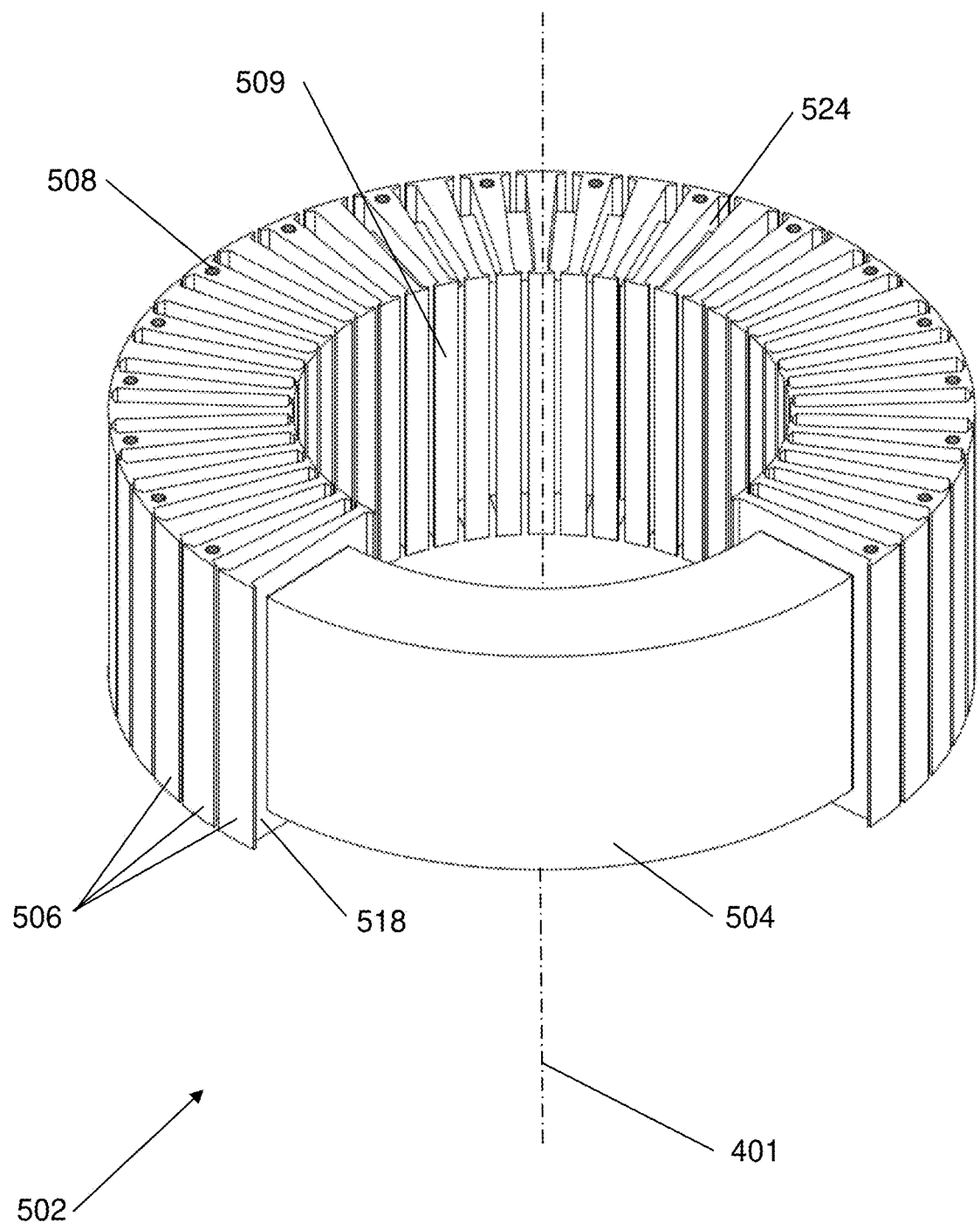
FIG. 4A is an isometric view of a partial coil assembly element.

Turning now to FIG. 4A, there is an isometric view of a coil assembly support 502, which in one embodiment, may be a portion of a stator used in conjunction with a rotor formed by the magnetic axial walls 402-404 and magnetic longitudinal walls 406-408 and the back iron circuit portions 202 and 204 discussed above in reference to FIGS. 1A through 3. In certain embodiments, the coil assembly support 502 comprises a cylindrical or ring core 504 coupled to a plurality of teeth 506 radially spaced about the ring core. FIG. 4A shows a portion of teeth 506 removed so that the ring core 504 is visible.

In certain embodiments, the ring core 504 and coil assembly support 502 may be made out of iron or back iron materials so that it will act as a magnetic flux force concentrator. Some back iron materials are listed above. In yet other embodiments, the coil assembly support 502 may be made from a composite material which would allow it to be sculptured to allow for cooling and wiring from inside. The composite material may be formed of a "soft magnetic" material (one which will produce a magnetic field when current is applied to adjoining coils). Soft magnetic materials are those materials which are easily magnetized or demagnetized. Examples of soft magnetic materials are iron and low-carbon steels, iron-silicon alloys, iron-aluminum-silicon alloys, nickel-iron alloys, iron-cobalt alloys, ferrites, and amorphous alloys. In yet other embodiments, portions of the coil assembly support may be made from laminate materials.

In yet other embodiments, a powdered metal, such as Somaloy 7003P may be used to form the coil assembly support 502. Somaloy 7003P is not sintered, but heat treated in a steam oxygen environment which causes its particles to bond when exposed to high pressure, such as 50 tons per square inch.

In certain embodiments, a wiring connection (not shown) can also be formed in the shape of a "plug" for coupling to the stator teeth. Thus, certain teeth of the plurality of teeth 506 may have holes 508 for such plugs (or wires) defined on one side for attachment to a structural support in embodiments where the coil assembly 500 acts as a stator. In yet other embodiments, these plugs 508 may be formed on an inside surface 509 of the coil assembly support 502.

Figure 4B:
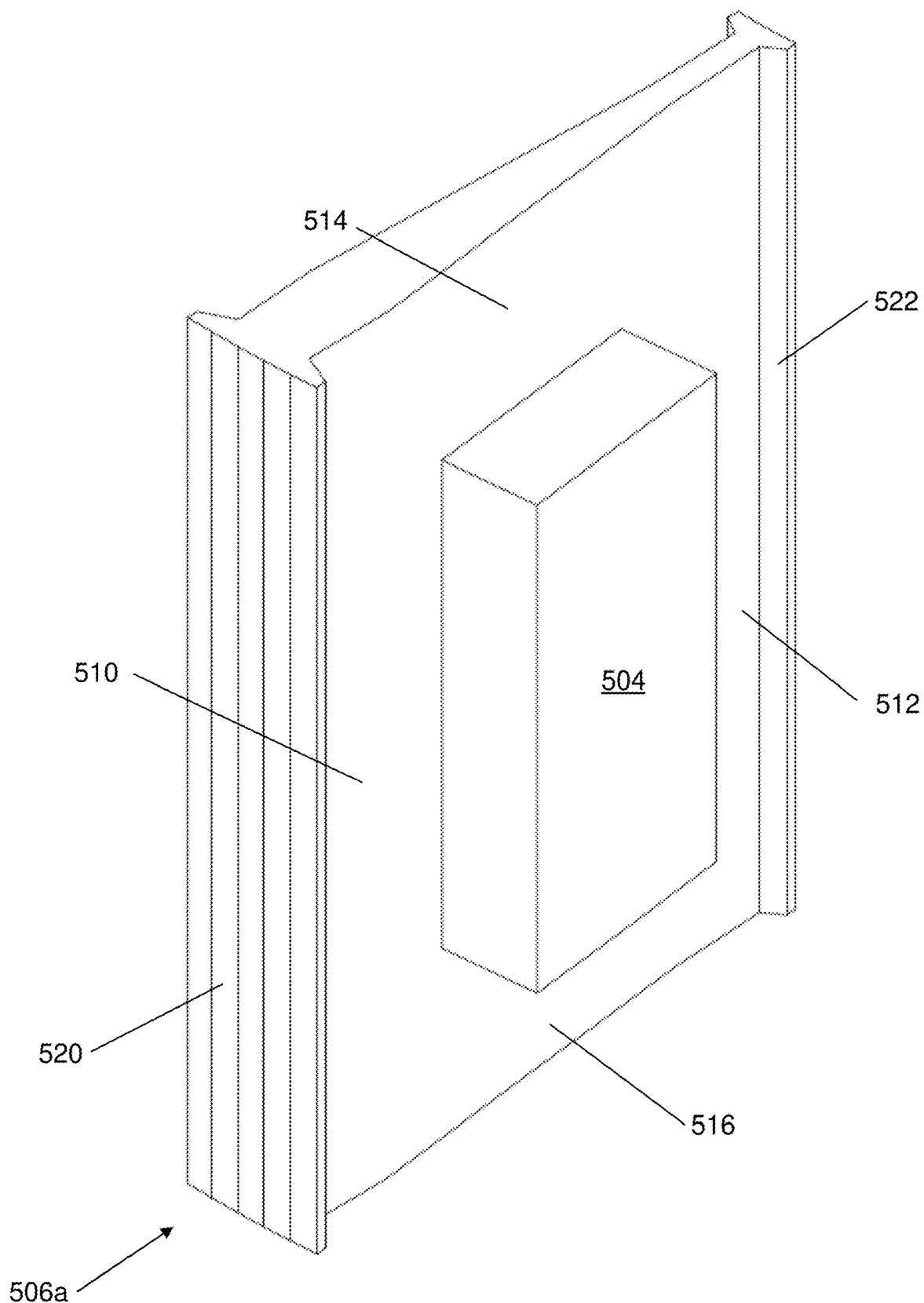
FIG. 4B is a detailed perspective view of a single tooth element of the partial coil assembly element illustrated in FIG. 4A.

In FIG. 4B, a single tooth 506 is illustrated coupled to a portion of the core 504. The tooth 506 may be made from a material similar to the material forming the core 504, for example, iron, a composite magnetic material, or laminated steel. In the illustrated embodiment, each tooth 506 extends from the ring core 504 in radial and vertical (or longitudinal) directions. Thus, each tooth 506 comprises an outer radial portion 510 extending radially away from the longitudinal axis 401 (see FIG. 4A), an inner radial portion 512 extending radially toward the longitudinal axis 401, a top vertical or longitudinal portion 514 extending in one vertical or longitudinal direction, and a bottom vertical or longitudinal portion 516 extending in the opposing longitudinal direction. The ring core 504 supports the individual tooth 506a as well as other teeth as described above in reference to FIG. 4A.

In certain embodiments, an exterior fin 520 couples to an exterior portion of the outer radial portion 510 and extends outward from the outer radial portion 510 in both circumferential or tangential directions with respect to the longitudinal axis 401. Similarly, in certain embodiments, an interior fin 522 couples to an interior portion of the inner radial portion 512 and extends outward from the inner radial portion 512 in both tangential directions.

Coils or Coil Windings

Figure 4C:
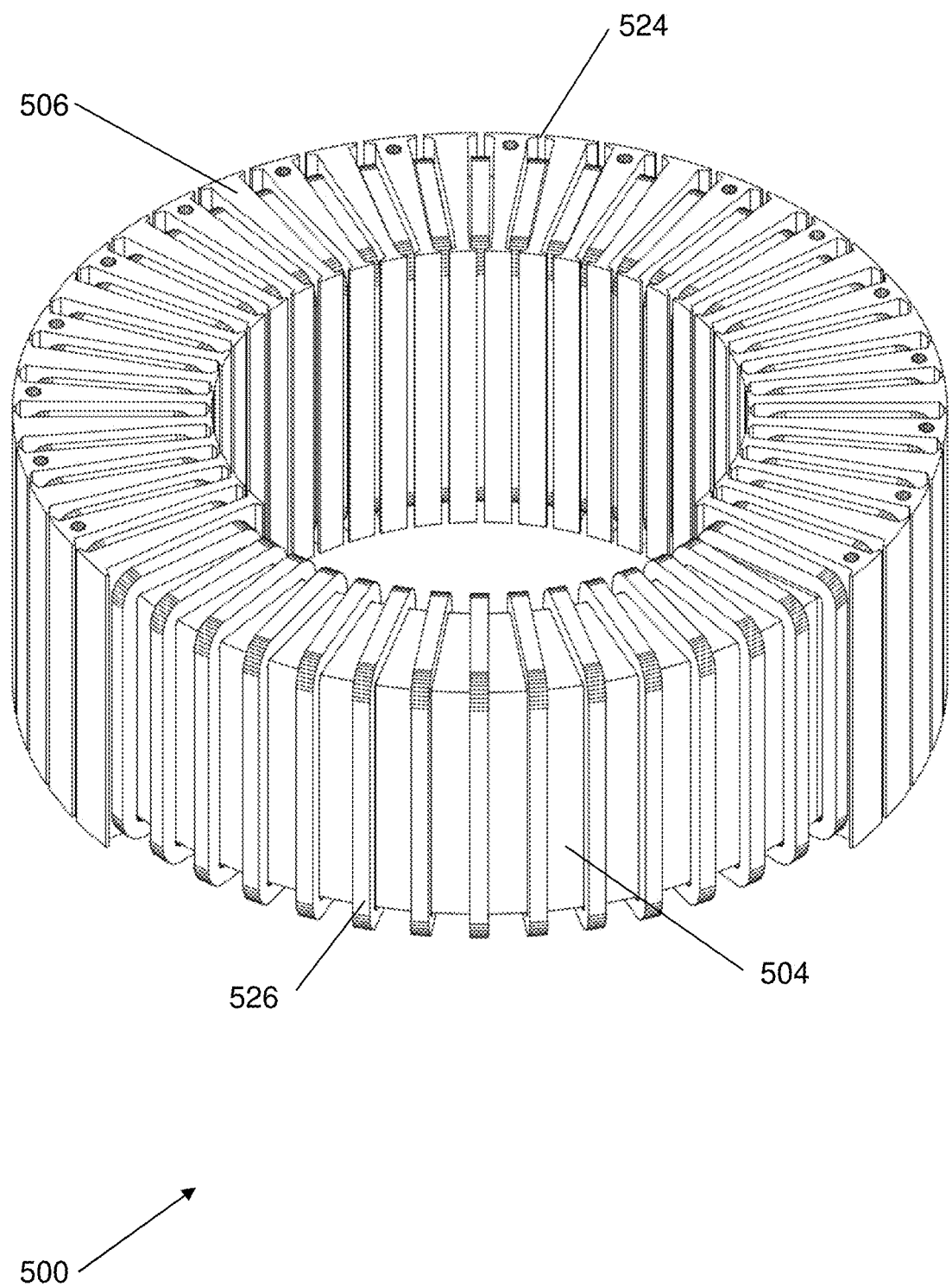
FIG. 4C is an isometric view of the partial coil assembly element of FIG. 4A coupled to a plurality of coil windings.
Figure 4D:
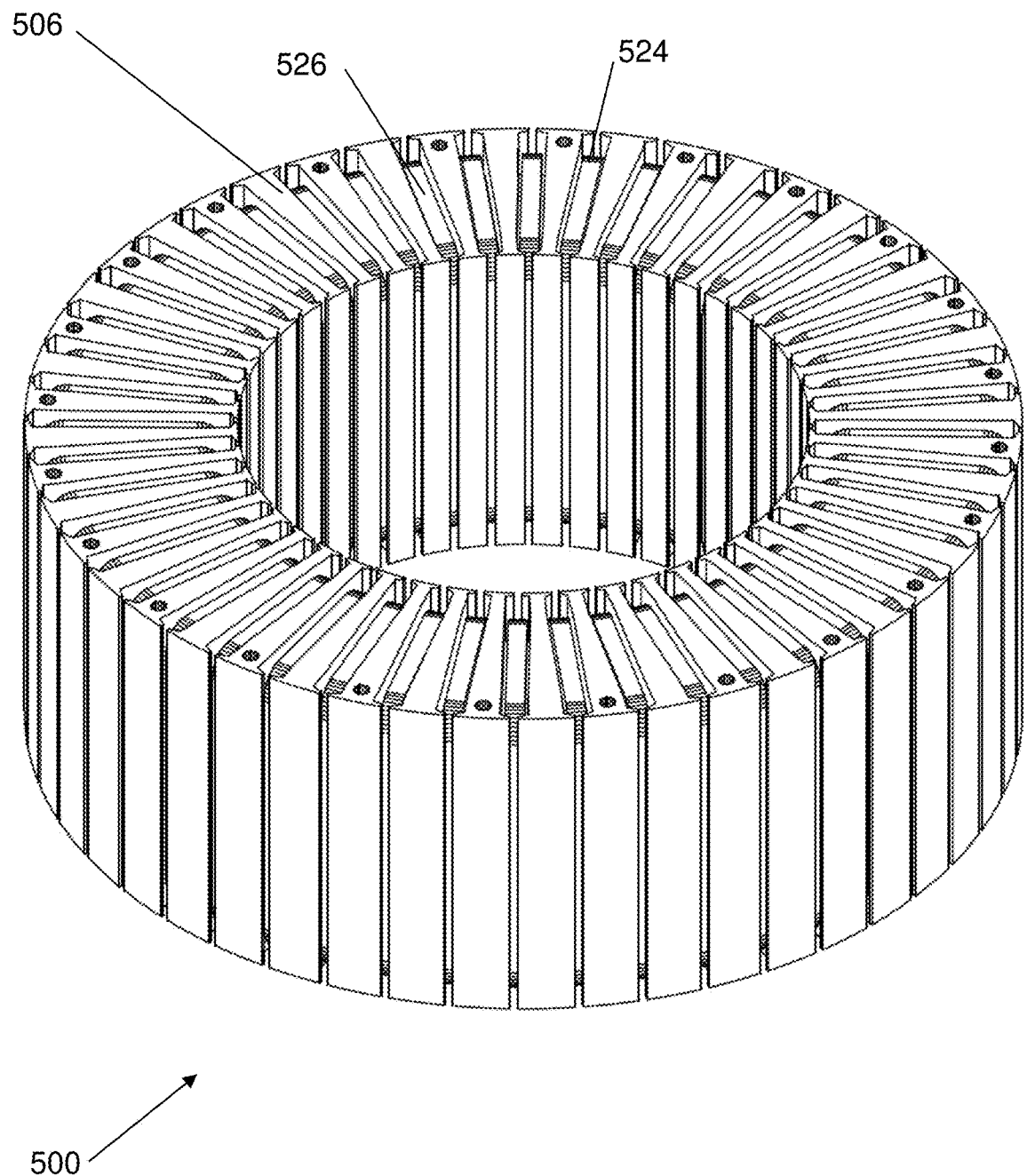
FIG. 4D is an isometric view of an assembled coil assembly.

Adjacent teeth 506 supported by the core ring 504 form radial slots 524 within the coil assembly support structure 502, as illustrated in FIG. 4A. A plurality of coils or coil windings 526 may be positioned radially about the ring core 504 and within the slots 524 as illustrated in FIG. 4C. FIG. 4C illustrates the plurality of coil windings 526 distributed about the ring core 504 with a number of teeth 506 removed for clarity. In contrast, FIG. 4D illustrates a complete coil assembly 500 showing all of the teeth 506 and coil windings 526 positioned within the slots 524.

Each individual coil 526 in the coil assembly 500 may be made from a conductive material, such as copper (or a similar alloy) wire and may be constructed using conventional winding techniques known in the art. In certain embodiments, concentrated windings may be used. In certain embodiments, the individual coils 526 may be essentially cylindrical or rectangular in shape being wound around the ring core 504 having a center opening sized to allow the individual coil 526 to surround and be secured to the ring core 504. Thus, in such embodiments, the winding does not overlap.

By positioning the individual coils 526 within the slots 524 defined by the teeth 506, the coils are surrounded by the more substantial heat sink capabilities of the teeth which, in certain embodiments, can incorporate cooling passages directly into the material forming the teeth. This allows much higher current densities than conventional motor geometries. Additionally, positioning the plurality of coils 526 within the slots 524 and between teeth 506 reduces the air gap between the coils. By reducing the air gap, the coil assembly 500 can contribute to the overall torque produced by the motor or generator.

In certain embodiments, the horizontal fins 518 and 519, the circumferential fins 520 and 522 of the teeth 506a (FIG. 4B) of the coil assembly 500 reduce the air gaps between the magnetic material and the coil structure to allow flux forces to flow in the proper direction when the coils are energized and the coil assembly 500 begins to move relative to the magnetic tunnel. Thus, all portions of the coil support assembly 502 contribute to the overall torque developed by the system. In yet other embodiments, the teeth 506 may not have any fins. Although the fins create a more efficient design, the fins complicate the fabrication of the coil windings, thereby increasing the motor costs. Unconventional winding techniques may be used when using fins—such as fabricating the coil assembly support 502 in conjunction with the coil windings. In some embodiments, a winding may be started at the center of the conductor length with two bobbins rotating in opposite directions around the core with the wound segments in separate parallel planes. This method has the advantage of both conductor ends exiting at the same location and eliminating compression of one conductor length exiting from the center of the winding.

The number of individual coils 526 can be any number that will physically fit within the desired volume and of a conductor length and size that produces the desired electrical or mechanical output as known in the art. In yet other embodiments, the coils 526 may be essentially one continuous coil, similar to a Gramme Ring as is known in the art.

The windings of each coil 526 are generally configured such that they remain transverse or perpendicular to the direction of the relative movement of the magnets (e.g. the rotor) comprising the coil assembly 500 and parallel with the longitudinal axis 401. In other words, the coil windings are positioned such that their sides are parallel with the longitudinal axis 401 and their ends are radially perpendicular to the longitudinal axis. As will be explained below, the coil windings are also transverse with respect to the magnetic flux produced by the individual magnets of the rotor at their interior face as described below in reference to FIG. 7A to 7C. Consequently, the entire coil winding or windings may be used to generate movement (in motor mode) or voltage (in generator mode).

In sum, the windings are placed in an axial/radial direction in multiple slots 524 (e.g. 48 slots) which can form a single phase or multi-phase winding. The radial/axial placement of the windings may create a maximum force in the direction of motion for all four sides of the windings.

The Magnetic Cylinder

Figure 5:
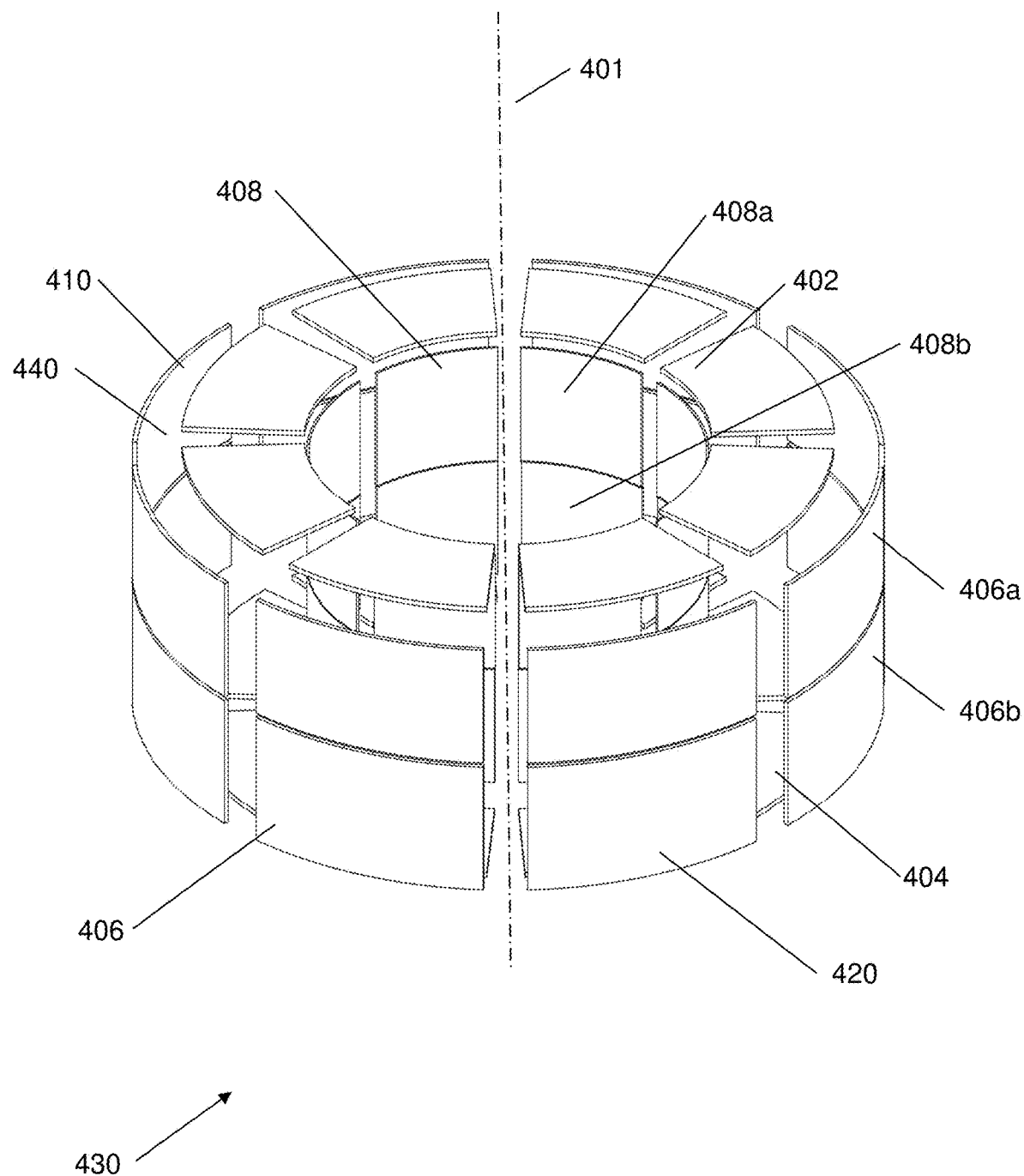
FIG. 5 illustrates one embodiment of a toroidal magnetic cylinder.

FIG. 5 is an isometric view of the magnetic disc assembly 400 with the coil assembly 500 removed for clarity. The magnets of the magnetic disc assembly 400 form a toroidal magnetic cylinder 430 defining a toroidal magnetic tunnel 440 positioned about the longitudinal axis 401. As described previously, the toroidal magnetic cylinder 430 includes: the top axial or side wall of magnets 402, the bottom or second axial or side wall of magnets 404, the outer cylindrical wall 406 of magnets positioned longitudinally between the first side wall 402 of magnets and the second side wall 404 of magnets; and the inner cylindrical wall 408 of magnets positioned concentrically within the outer cylindrical wall 406 of magnets. In certain embodiments, the outer cylindrical wall 406 may be formed by two pluralities of magnets 406a and 406b, where each plurality of magnets are sized to couple with the back iron circuit walls 206 and 216, respectively. Similarly, the inner cylindrical wall 408 may be formed by two pluralities of magnets 408a and 408b, where each plurality of magnets are sized to couple with the back iron circuit walls 208 and 218, respectively.

As discussed above with respect to the back iron circuit 200, depending on the embodiment, there may be a radial circumferential slot 410 defined by the outer longitudinal ring of magnets 406 and one of the side walls 402 or 404 to accommodate a support structure for the stator and/or control wires, conductors, ventilation and/or a cooling medium. In other embodiments, there may be a circumferential slot separating the outer cylinder wall 406 of magnets into a first longitudinal ring 406a and a second longitudinal ring 406b of magnets. In yet other embodiments, there may be a circumferential slot separating the inner cylinder wall 408 of magnets into a first longitudinal ring 408a and a second longitudinal ring 408b of magnets. In yet further embodiments, a circular slot may be defined anywhere within the side walls 402 or 404.

In the embodiment illustrated in FIG. 5, the magnetic side walls 402, 404 and the magnetic cylindrical walls 406 and 408 may be made from commercially available magnetic segments. In other embodiments, plate magnets may be customized for a particular application. The number of segments forming the rings or walls will depend on the particular design and performance characteristics for a particular application.

Note that in the illustrative embodiment of FIG. 5, there are eight radial "slices" or magnetic segments 420 forming a complete toroidal magnetic cylinder 430. However, the exact number of segments depends on the size, performance characteristics, and other design factors.

Figure 6:
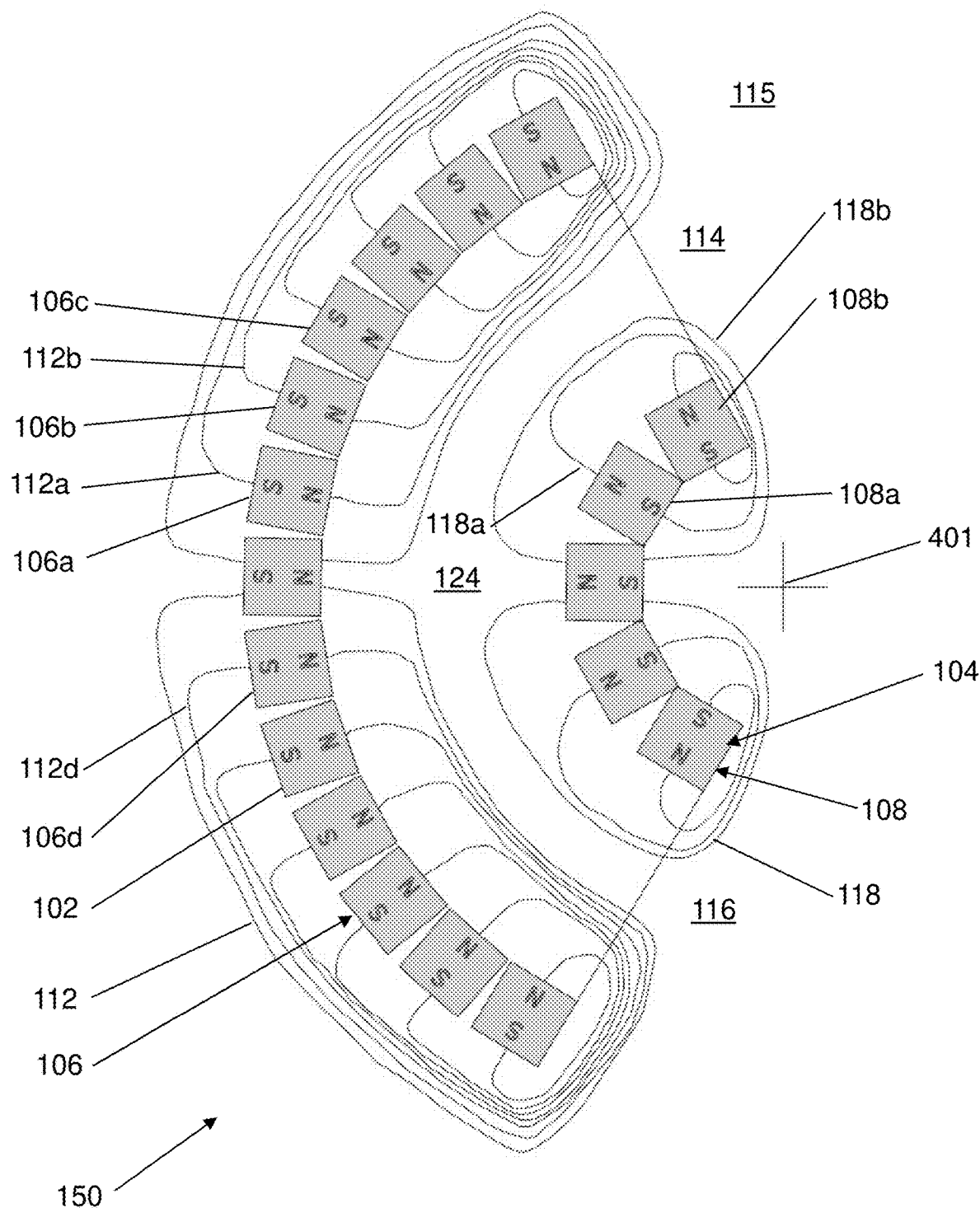
FIG. 6 illustrates a conceptual two-dimensional radial segment of a toroidal magnetic cylinder.

FIG. 6 is a cross-sectional conceptual view of one embodiment of a radial "slice" 150 of a magnetic cylinder which is conceptually similar to the radial segment 420 of the toroidal magnetic cylinder 430 of FIG. 5 above. In certain embodiments, the partial magnetic cylinder 150 comprises an outer curved wall 102 and an inner curved wall 104. The outer curved wall 102 and inner curved wall 104 may be made with a plurality of magnets. In a lateral section view, such as illustrated in FIG. 6, it can be seen that the outer curved wall 102 is comprised of a plurality of magnets 106, comprising individual magnets, such as magnets 106a, 106b, 106c, etc. Similarly, the inner curved wall 104 may be comprised with a plurality of magnets 108, comprising individual magnets 108a, 108b, etc. It should be noted that only one polarity of the magnets are utilized within (or facing into) the partial magnetic cylinder 150. For instance in the illustrative embodiment of FIG. 6, the north poles of the magnets 106 are each pointing radially towards the center or longitudinal axis 401 (which is coming out of the page in FIG. 6). On the other hand, the north poles of the magnets 108 each point radially away from the longitudinal axis 401 and towards an interior cavity or tunnel 124 of the partial magnetic cylinder 150.

In certain embodiments, there may be a central core, such as an iron core (not shown in FIG. 6), where a portion of the core is positioned within the interior tunnel 124 between the outer curved wall 102 and the inner wall 104. In certain embodiments, the core may be used as a magnetic flux line concentrator.

When the plurality of magnets 106 and 108 are arranged into the outer wall 102 and inner wall 104 to form a partial magnetic cylinder 150, the density of the magnetic flux forces will form particular patterns as represented in a conceptual manner by the flux lines 112 illustrated in FIG. 6. The actual shape, direction, and orientation of the flux lines 112 depend on factors such as the use of an interior retaining ring, a center core, a back iron circuit, material composition and/or configuration.

To generally illustrate this magnetic arrangement, the flux line 112a (or flux lines) from the magnet 106a of the outer curved wall 102 tends to flow from the north pole (interior face) of the magnet in a perpendicular manner from the face of the magnet into and through the interior tunnel 124 of the partial magnetic cylinder 150, exiting through the open end 114 into the open area 115, then flow around the exterior of the partial magnetic cylinder 150, and back to an exterior face of the magnet 106a containing its south pole.

Similarly, the flux line 112b from the magnet 106b of the outer curved wall 102 tends to flow from the north pole of the magnet in a perpendicular manner from the face of the magnet into and through the interior tunnel 124 of the partial magnetic cylinder 150, exiting through the open end 114 into the open space 115, then flow around the exterior of the cylinder 150, and back to the face of the magnet 106b containing its south pole. Although only a few flux lines 112 are illustrated for purposes of clarity, each successive magnet in the "top portion" of the plurality of magnets will produce similar flux lines. Thus, the magnetic flux forces for each successive magnet in the plurality of magnets 106 tend to follow these illustrative flux lines or patterns for each successive magnetic disc in the plurality of magnets 106 until the magnets at the open ends 114 or 116 of the partial magnetic cylinder 150 are reached.

As illustrated, the magnet 106a is positioned circumferentially adjacent to the magnet 106b. In turn, another magnet 106c is positioned circumferentially adjacent to the magnet 106b. Additional magnets in the plurality of magnets 106 may be positioned circumferentially adjacent to others until the open end 114 is reached. The flux lines 112 generated from the adjacent magnetic poles in the plurality of magnets 106 are concentrated at the open ends of the tunnel segment where they turn back towards an exterior face of the respective magnet.

Magnets in the "bottom portion" of the plurality of magnets 106, such as magnet 106d tend to generate flux lines 112d from the magnet 106d on the outer curved wall 102 which tends to flow from the north pole (interior face) of the magnet in a perpendicular manner from the face into and through the interior tunnel 124 of the partial magnetic cylinder 150, exiting through an open end 116 into the open space, then flow around the exterior of the partial magnetic cylinder 150, and back to an exterior face of the magnet 106d containing its south pole. Although only a few flux lines on the opposing side of the partial magnetic cylinder 150 are illustrated for purposes of clarity, each successive or magnet in the plurality of magnets will produce similar flux lines which will also be concentrated at the opening 116 as described above. In embodiments with an iron core, the flux lines will generally flow in a similar manner, but will tend to flow through the core and be concentrated within the core. Thus, in certain embodiments, the core may act as a flux concentrator.

The interior magnetic wall 104 also produces flux forces, which also may be illustrated by flux lines, such as exemplary flux lines 118. For instance, the flux line 118a from the magnet 108a on the interior wall 104 tends to flow from interior face (e.g., the north pole) in a perpendicular manner from the face of the magnet, into and through the interior tunnel 124 of the partial magnetic cylinder 150, out the open end 114 (or open end 116) and into the open space 115, then around the interior wall 104 to the face of the magnet 108a containing its south pole.

The magnetic flux forces for each successive magnet in the plurality of magnets 108 tend to follow these illustrative flux lines or patterns 118 for each successive magnet in the plurality of magnets 108 until the open ends 114 or 116 of the partial magnetic cylinder 150 are reached. Thus, the flux forces produced by the magnets of the interior wall 104 of the partial magnetic cylinder 150 have an unobstructed path to exit through one of the open ends of the partial magnetic cylinder and return to its opposing pole on the exterior or interior of the cylinder.

As discussed above, the magnetic flux lines 112 and 118 will tend to develop a concentrating effect and the configuration of the exterior magnetic cylinder manipulates the flux lines 112 and 118 of the magnets in the partial magnetic cylinder 150 such that most or all of the flux lines 112 and 118 flow out of the open ends 114 and 116 of the partial magnetic cylinder. In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles (e.g. (all south or all north) radially with respect to the longitudinal axis 401, the flux lines 112 and 118 tend to radiate perpendicularly from the surface of the magnets. This configuration allows for greater tolerances between coils and the partial magnetic cylinder 150.

The partial magnetic cylinder 150 is a simplified two dimensional section illustration of a three dimensional magnetic arrangement concept. The three dimensional arrangement also has magnetic top and bottom magnetic walls with their north magnetic poles facing the interior of the tunnel 124 (not shown). Additionally, similar results can be obtained by replacing the plurality of magnets 106 with a single curved plate magnet magnetized in a similar manner (e.g., a north pole is formed on the interior face and a south pole is formed on an exterior face). Similarly, the plurality of magnets 108 may be replaced with a single curved plate magnet having its north pole on the surface facing the interior tunnel 124 and the south pole on the surface facing towards the longitudinal axis 401.

Figure 7A:
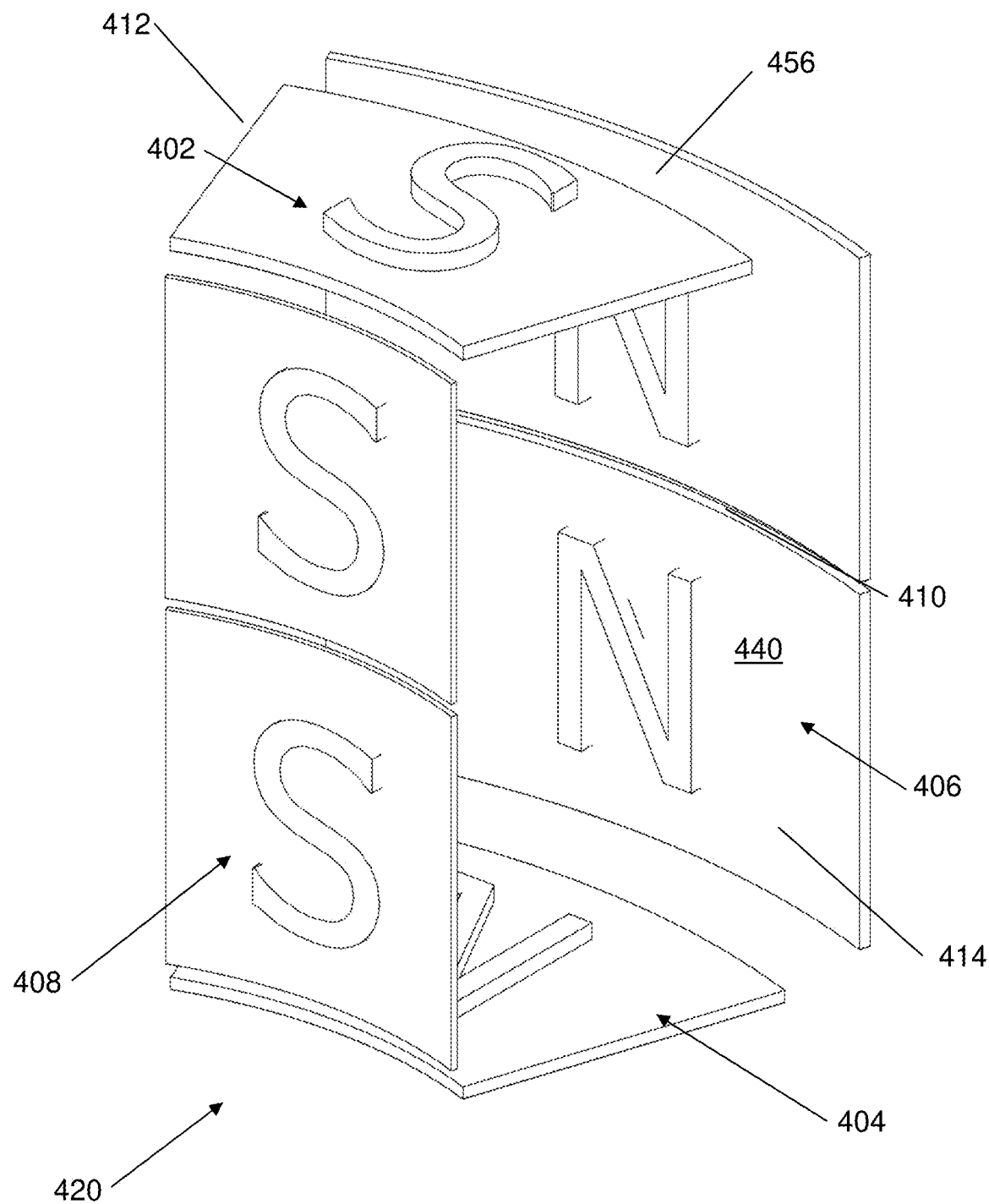
FIG. 7A is a detailed isometric view of one embodiment of a radial portion or radial segment of the toroidal magnetic cylinder illustrated in FIG. 5.

FIG. 7A is a detailed perspective view of the radial segment 420 of the toroidal magnetic cylinder 430 (see FIG. 5) defining a portion of the magnetic tunnel 440 as discussed above in reference to FIG. 5. The radial segment 420 is conceptually similar to the partial magnetic cylinder 150 because the radial segment 420 has an outer curved magnetic wall 406 and an inner curved magnetic wall 408. In addition to the curved or cylindrical magnetic walls 406 and 408, there are also magnetic axial or lateral walls 402 and 404 which in this illustrated embodiment may be made of wedge shaped plate magnets.

The magnetic poles of the magnets forming the outer cylindrical wall 406 and the inner cylindrical wall 408 have their magnetic poles orientated radially pointing towards the longitudinal axis 401 (see FIG. 5). In contrast, the magnetic poles of the magnets forming the top or first axial wall 402 and the bottom or second axial wall 404 have their magnetic poles orientated or aligned parallel with the longitudinal axis 401. The individual magnets in the magnetic walls 402, 404, 406, and 408 all have their similar or "like" (e.g. north) magnetic poles orientated either towards or away from the interior of the tunnel 440 of the toroidal magnetic cylinder 430 to form a "closed" magnetic tunnel 440. The closed magnetic tunnel 440 runs circumferentially from the open end or exit 412 to the open end or exit 414 (similar to the tunnel 124 and open ends 114 and 116 discussed above with reference to FIG. 6).

For purposes of this disclosure and to illustrate the orientation of magnetic poles at the surfaces of the magnets forming the radial segment 420, the top axial wall 402 is labeled with an "S" on its exterior top face to indicate that in this particular configuration, the south pole of the magnet (or magnets) forming the top axial wall 402 faces away from the tunnel 440. Thus, the north pole of the magnet 402 faces towards the tunnel segment 440. Similarly, the lower axial or side wall 404 is labeled with a "N" on its interior side face to indicate that the north pole of the magnet forming the side wall 404 is facing towards the tunnel segment 440 (however, in this view the "N" is partially obscured). The two magnets forming the outer longitudinal wall 406 are labeled with an "N" on their interior surfaces to indicate that their north magnetic poles face the interior of the magnetic tunnel 440. In contrast, the two magnets forming the inner longitudinal wall 408 are labeled with an "S" on their exterior surfaces to indicate that their south poles are facing away from the tunnel 440. Thus, their north poles face towards the tunnel 440.

Figure 7B:
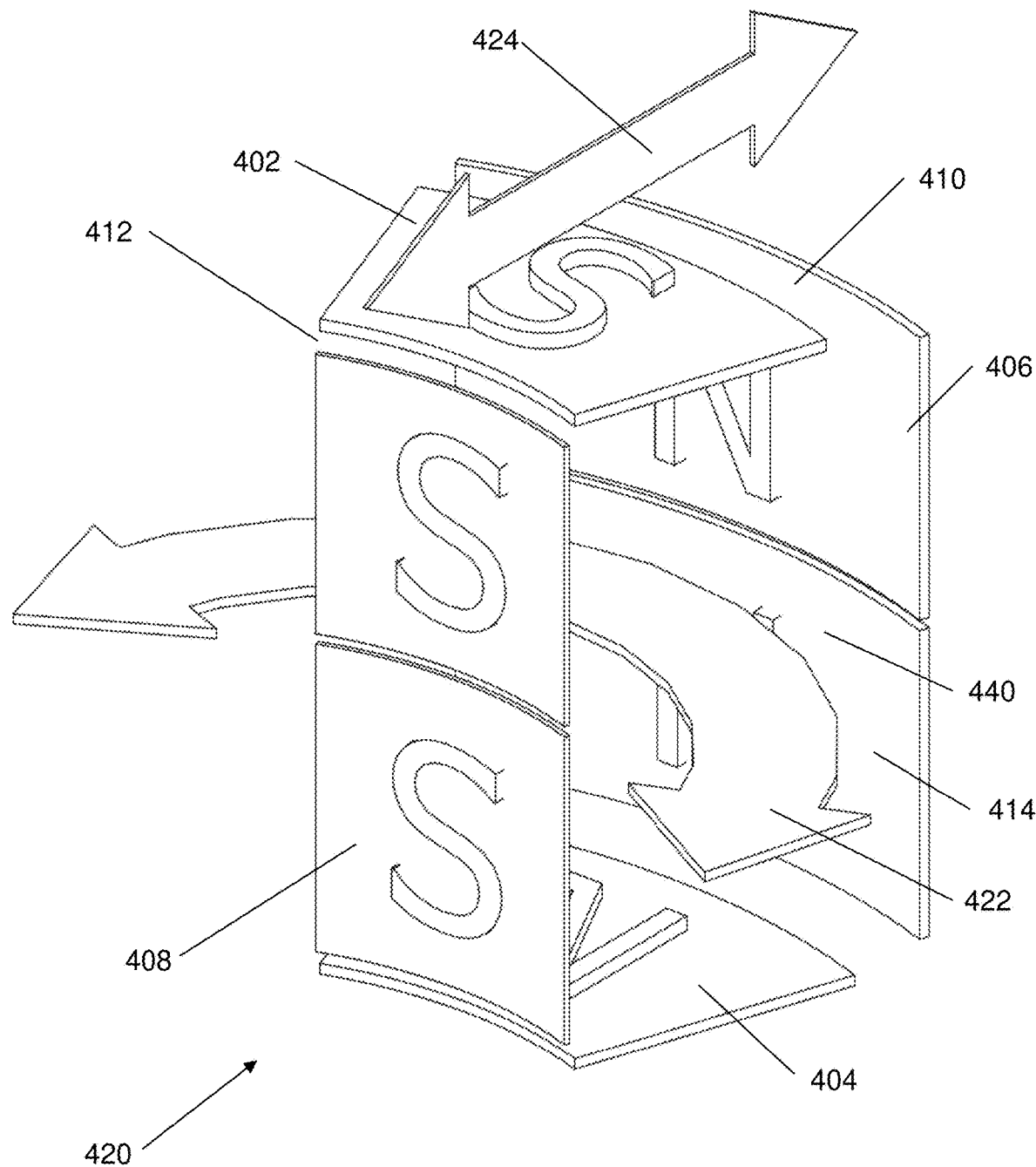
FIG. 7B is a detailed isometric view of one embodiment of the radial portion or radial segment illustrated in FIG. 7A with the addition of direction arrows.

In this illustrative embodiment of the radial segment 420, all the magnets of the walls 402, 404, 406 and 408 have their north poles facing towards the interior or tunnel 440. So, the radial segment 420 has an NNNN magnetic pole configuration. Thus, the magnetic forces which tend to repel each other—forcing the magnetic flux circumferentially along the tunnel 440 in a circumferential direction and out the tunnel exits 412 and 414 similar to that described above in reference to FIG. 6. FIG. 7B is an illustration of the radial segment 420, but with the addition of directional arrows. Arrow 422 illustrates a circumferential direction and the arrow 424 illustrates a radial direction.

The term "closed magnetic tunnel" as used in this disclosure refers to using an arrangement of the magnets forming a tunnel that "forces" or "bends" the majority of the magnetic flux "out of plane" or circumferentially through the tunnel or interior cavity then out through one of the openings 412 or 414 as illustrated by the circumferential arrow 422 of FIG. 7B. In contrast, if the magnetic tunnel were not magnetically "closed," the flux forces would generally flow in a radial manner in the direction of the radial or lateral arrow 424 (or in a plane represented by the arrow 424). Conventional motors usually allow flux forces to flow in a radial direction as illustrated by the arrow 424.

Figure 7C:
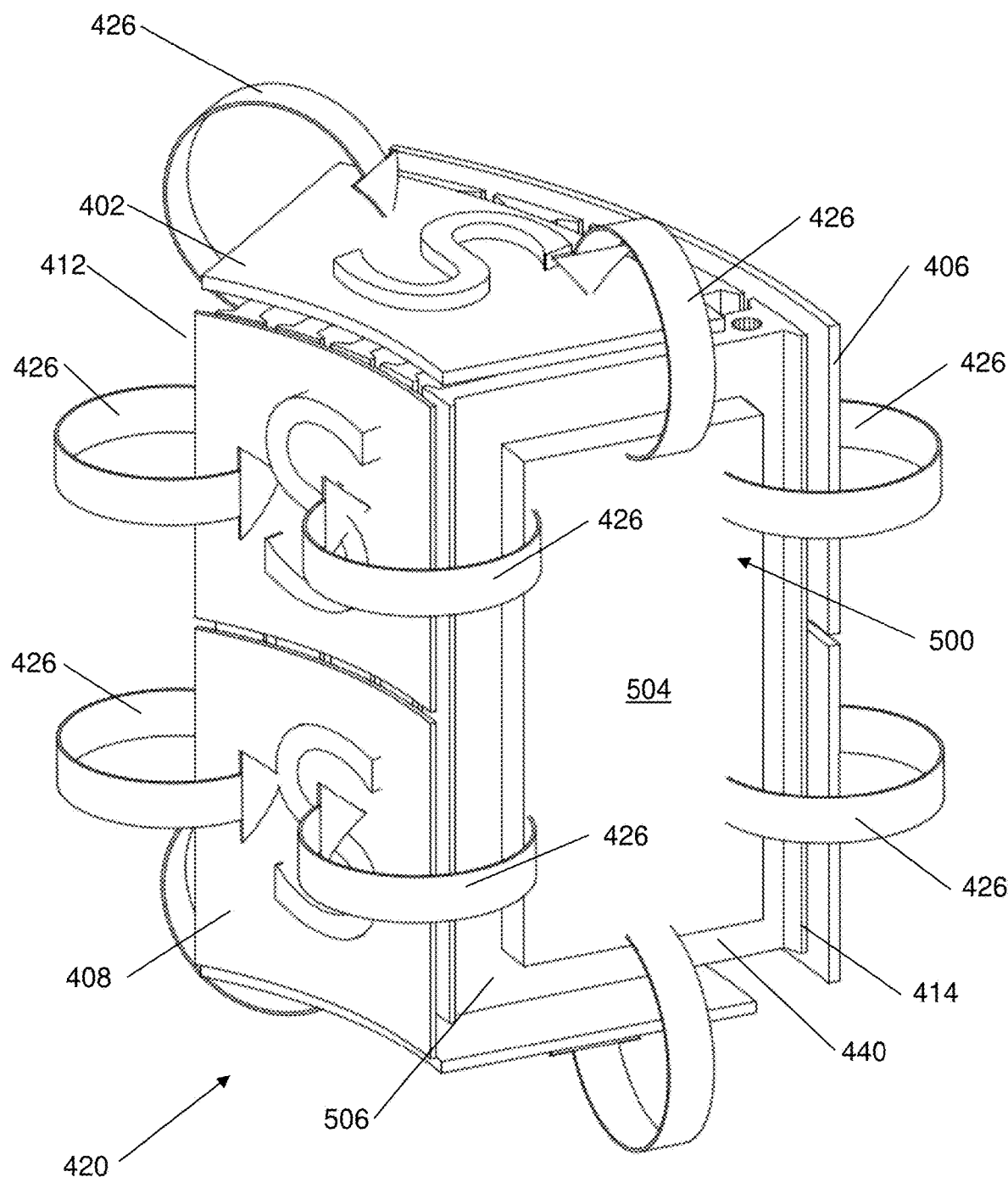
FIG. 7C is a detailed isometric view of one embodiment of the radial portion or radial segment illustrated in FIG. 7A with the addition of a portion of a coil assembly illustrated in FIG. 4E.

Turning now to FIG. 7C, there is illustrated an isometric view of radial segment 420 with a portion of the coil assembly 500 positioned within the interior of the segment or tunnel 440 (FIG. 4A). The rest of the coil assembly 500 has been removed for clarity. In an un-energized state, the magnetic flux tends to flow from the north poles of the magnetic walls 402, 404, 406 and 408 into the coil assembly 500 and to the coil core 504. Because of opposing magnetic forces, the magnetic flux continues to flow circumferentially through the coil core 504 until the flux reaches an opening (for instance, open end 414) of the tunnel 440. The flux then bends back around an open end (e.g. open end 414) of the radial segment 420 to an exterior face of the respective magnetic wall containing a south pole. Arrows 426 of FIG. 7C are meant to illustrate the three dimensional flux path as the flux reaches an open end 412 or 414 of the radial segment and bends back around to an exterior face (or in this case, the south pole) of the appropriate magnetic wall. Thus, the radial segment 420 generates a flux field which is conceptually similar to the flux fields of the flux lines 112 and 118 discussed above in reference to FIG. 6 (In situations where a radial segment 420 is adjacent to another radial segment of an opposite magnetic polarity configuration, the flux lines could extend into the adjacent partial toroidal magnetic cylinder).

In certain embodiments, the core 504/coil assembly 500 may generate its own magnetic field fluxes as current is introduced into the supporting coils 526 (FIG. 4D). The majority of magnetic field fluxes are also constrained and channeled to interact with the magnetic flux generated from the magnetic tunnel (e.g., from permanent magnets) in a similar manner to that described above. Thus, all portions of the coil 504/coil assembly 500 may interact with the flux lines of the magnetic tunnel 440 to allow full utilization of the flux lines and all forces working together in the direction of motion.

In certain embodiments, the longitudinal length or "width" of the outer walls 406 and inner walls 408 may be greater than the radial or lateral depth (or length) of the side walls 402 and 404 as illustrated in FIGS. 7A-7C. This geometric proportion results in greater torque generation along the interface of the outer wall 406 and coil assembly 502. In certain alternate embodiments, the thickness of the magnets comprising the outer wall 406 may also be increased to increase the generation of torque. In any event, the contribution to torque from the outer wall 406 and the inner wall 408 may be greater than the contribution from the side walls 402 and 404 due to the geometry of the cross-section of the radial segment 420 and the varying radius of the components.

Turning back to FIG. 7B, this embodiment may be thought of as a four rotor motor. The magnetic outer wall 406 may be characterized as one rotor. The magnetic inner wall 408 may be characterized by a second rotor. The magnetic side wall 402 may be characterized as a third rotor and the magnetic side wall 404 may be characterized as a fourth rotor. In other nomenclature, this embodiment may be thought of as an axial flux motor having two rotors (side walls 402 and 404), a first radial motor having an outer rotor (e.g. outer wall 406) and a second radial motor having an inner rotor (e.g. inner wall 408). The total torque produced by certain embodiments, however, may be greater than the additive torques of the individual motors and or rotors.

Turning back to FIG. 7C, this embodiment may also be thought of as having four separate torque producing areas (magnets or magnetic walls and an energized coil). The first torque producing area may be the area and coil portion adjacent to the outer wall 406. The second torque producing area is the area and coil portion adjacent to the inner wall 408. The third torque producing area is the area and coil portion adjacent to the side wall 402. The fourth torque producing area is the area and coil portion adjacent to the side wall 404. In certain embodiments, the torque generated by the first two torque producing areas (those generally parallel with the longitudinal axis) are greater than the torque produced by the side areas (those generally transverse to the longitudinal axis).

Although the core, coil assembly, and magnetic radial segments are illustrated in cross-section as rectangular, any cross-sectional shape may be used depending on the design and performance requirements for a particular motor or generator. In a preferred embodiment, there is more magnetic material positioned in or along an outer wall (such as the magnetic wall 406) along the longitudinal direction than magnetic material positioned in or along a radial wall (such as the axial or side walls 402 or 408). For instance, if the magnets forming the magnetic walls are all the same thickness, the length of the outer wall in the longitudinal direction is greater than the length of the axial or side walls in the radial direction. In alternative embodiments, the length of the magnets forming the outer magnetic wall may be the same or shorter than the length of the magnets forming the axial or side walls.

The unique configurations illustrated in FIGS. 7A-7C also leads to several unique properties. For instance, an individual coil 526 and core portion 504 will tend to move out of the tunnel 440 on its own accord (e.g. with no power applied). The natural tendency of this configuration is for the coil 526 to follow the flux lines to the nearest exit 412 or 414. Conversely if a current is applied the coil 526, the coil 526 will move though the entirety of the magnetic tunnel depending on polarity of the power applied. The encapsulation of the coil 526 in the magnetic flux of the magnetic tunnel 440 also allows all magnetic fields to be used to generate motor or electric power. Cogging effects can be reduced as the coil will tend to travel out of the tunnel when no current applied. This also means that the coil 526 does not have to be pulsed with an opposing magnetic field at any point while in the magnetic tunnel 440. Additionally, the coil 526 will travel through the entire magnetic tunnel 440 length with a single DC pulse of the correct polarity. Non-sinusoidal torque or voltage is generated throughout the duration of time that the coil 526 is under the influence of the magnetic tunnel 440 and alternating polarities are not required for this effect to occur.

Figure 7D:
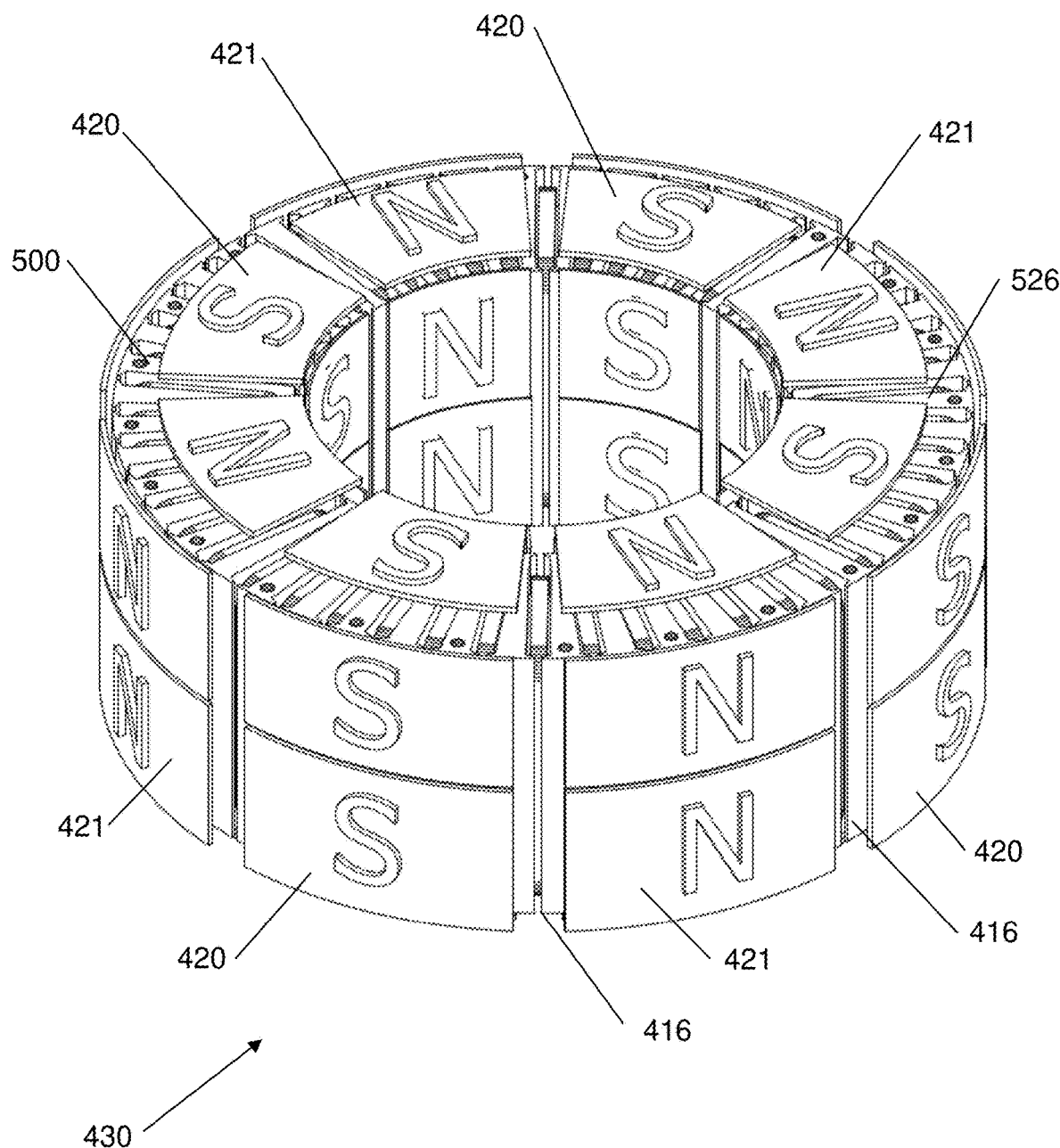
FIG. 7D illustrates one embodiment of the coil assembly of FIG. 4E positioned within the toroidal magnetic cylinder of FIG. 5.

As illustrated in FIG. 7D, the illustrative embodiment of the toroidal magnetic cylinder 430 comprises eight radial segments where four radial segments 421 are interspersed between the four radial segments 420. The four radial segments 421 are identical to the radial segments 420 except that the magnetic pole orientation of the magnets has been reversed. So, in the radial segment 420, all of the interior facing magnetic poles are north forming a NNNN magnetic tunnel configuration as illustrated in FIG. 7A. In contrast, in the radial segment 421, all of the interior facing magnetic poles are south forming a SSSS magnetic tunnel configuration. Thus, the tunnels radial segments 420 generate flux fields which are of an opposite polarity to the flux fields generated by the radial segments 421. In traditional motor terminology, each radial segment is a motor magnet pole. Thus, each radial segment is a three dimensional magnetic pole which can create a three dimensional symmetric magnetic field. Alternating the segments then produces a sinusoidal field.

With regard to the toroidal magnetic cylinder 430, each magnetic or radial segment (e.g. radial segments 420 or 421) has their respective magnetic configuration (NNNN or SSSS) of like magnetic polarities reversed for each adjacent radial segment. Although, an eight segment toroidal magnetic cylinder 430 is illustrated in FIG. 7D, in other embodiments, two, four, six, ten, etc. segments may be used. The number of segments selected for any given application may be based on engineering design parameters and the particular performance characteristics for an individual application. The scope of this invention specifically includes and contemplates multiple segments having an opposite polarity to the adjacent partial toroidal magnetic cylinders. For simplicity and illustrative purposes, an eight segment toroidal magnetic cylinder is described herein. However, this design choice is in no way meant to limit the choice or number of segments for any multi-segment toroidal magnetic cylinder.

In certain embodiments, the radial segments 420 and 421 may be sized to allow circumferential gaps 416 to form when the partial toroidal magnetic cylinders are assembled into the complete cylinder 430 as illustrated in FIG. 7D.

As described above, in certain embodiments, the individual magnets forming the toroidal magnetic cylinder 430 couple to various components of the back iron circuit 200. The back iron circuit 200 may be used to channel part of the magnetic flux path.

The Integrity of the Magnetic Tunnel

As described above in reference to FIGS. 6, 7A-7C, by surrounding a coil on all sides with "like" polarity magnets (e.g. all north poles or all south poles), the flux lines from those magnets are forced to travel through the center of the "magnetic tunnel" 440 formed by the surrounding magnets—along the radial or circumferential direction 422 (FIG. 7B) and eventually exit at the mouth or open ends 412 and 414 of the tunnel 440 (see FIG. 7C). The natural tendency of the flux lines is to flow along the shortest path—which is usually in the radial, lateral or "sideways" direction 434 (see FIG. 7B). Although some flux leakage may be acceptable, if the flux leakage is large, the integrity of the magnetic tunnel 440 will be compromised and the flux lines will no longer travel in the circumferential direction. If the flux lines do not travel in the circumferential direction, many of the advantages of certain embodiments will be lost.

As illustrated in FIG. 7A for instance, there are a number of slots or "gaps" between the magnet walls, such as the circumferential slot 410 or slot 411. These gaps may be carefully controlled or too much flux will leak through the gaps and essentially destroy the magnetic flux integrity of the magnetic tunnel 440. In an ideal world, there would be no slots or gaps in the tunnel and thus, it would be impossible for the flux lines to escape laterally. However, if there were no slots, it would be difficult to support the coil assembly and to providing electrical and cooling conduits to the coil assembly.

One method of controlling gap flux leakage is to limit the lateral width of the gaps. For instance, the total length of the sides of the "magnetic tunnel" may be substantially larger than the circular support mechanism slot and the slot reluctance may be high enough to force a circumferential magnetic flux field to form in the magnetic tunnel 440. As an example, limiting the lateral width of the circumferential slots to roughly a ratio of 1 unit of slot width to every 12 units of circumference/perimeter length may provide enough transverse flux lines to steer the majority of the flux lines along the circumferential direction 422 as discussed above.

Another solution is placing another group or group of magnets in close proximity with the slots such they generate an addition flux field lines across the gap or slot. For instance, two groups of magnets positioned on either side of coil assembly may produce enough "cross flux" to keep the flux in the magnetic tunnel from escaping. A magnet on one side of the slot may have its north pole facing the slot. An opposing magnet on the other side of the slot may have is south pole facing the slot. Thus, cross flux lines from the north pole to the south pole would be generated across the slot.

In one embodiment, permanent magnets orientated to provide a cross flux may be embedded in a coil assembly supporting structure or embedded in the back iron material. In other embodiments, powdered magnetic material may be used. In yet other embodiments, strongly diamagnetic materials (Pyrolytic carbon and superconductor magnets have been shown to be capable of rejecting force lines, and thus could be used.

Defining the Flux Path with the Back Iron Circuit

Figure 8:
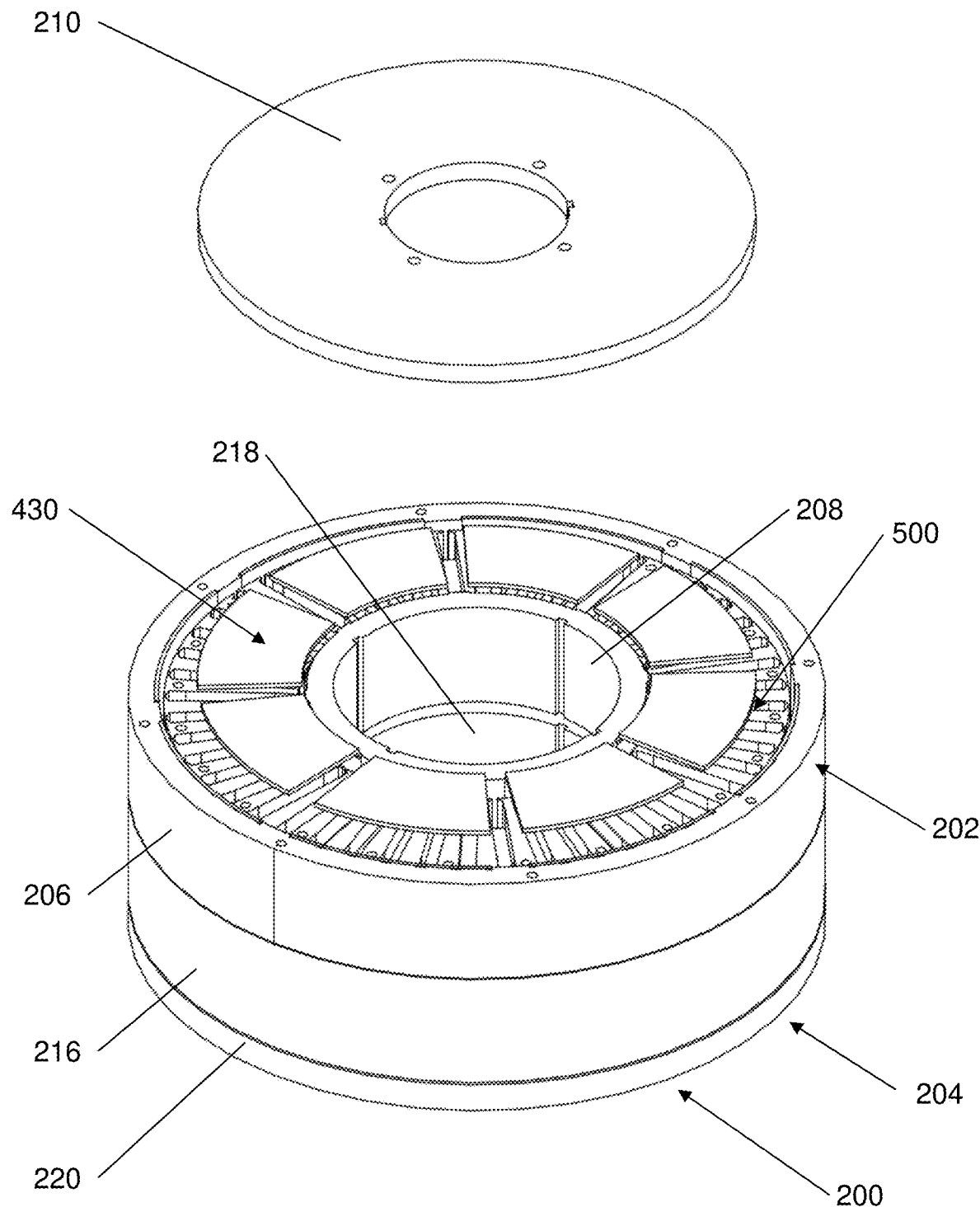
FIG. 8 illustrates the magnetic cylinder of FIG. 7D coupled to a back iron circuit with a portion of the side back iron circuit positioned in an exploded view for clarity.

FIG. 8 is an isometric view illustrating the coil assembly 500 positioned within the toroidal magnetic cylinder 430 which is coupled to and surrounded by the back iron circuit 200. The first flat side wall 210 has been repositioned in an exploded view for clarity. As described above, in the illustrative embodiment, the back iron circuit 200 may include a first side or axial wall 210 and the second side or axial wall 220. In this embodiment, the first outer cylindrical wall 206 and the second outer cylindrical wall 216 forms and couples to and surrounds the outer magnetic walls 406a and 406b of the toroidal magnetic cylinder 430, respectively (see FIG. 5). The first inner cylindrical wall 208 and the second inner cylindrical wall 218 is coupled to and surrounded by the inner wall magnets 408a-408b of the toroidal magnetic cylinder 430 (see FIG. 5). Thus, the entire back iron circuit 200 includes the inner cylindrical walls 208 and 218, the outer cylindrical walls 206 and 216, and the side or axial walls 210 and 220 as illustrated in FIG. 8. In certain embodiments, the back iron circuit 200 combined with the toroidal magnetic cylinder 430 may form a rotor (or a stator depending on the motor configuration). In certain embodiments, the back iron circuit 200 may be used to channel part of the magnetic flux path. The back iron material channels the magnetic flux produced by the toroidal magnetic cylinder 430 through the back iron material (as opposed to air) to reduce the reluctance of the magnetic circuit. In certain embodiments, therefore, the amount or thickness of the magnets forming the toroidal magnetic cylinder (if permanent magnets are used) may be reduced when using the appropriately designed back iron circuit.

Applying Mechanical Torque or Current

In "motor" mode, current is induced in the coils 526, which will cause electromotive forces to move the coil assembly 500 relative to the toroidal magnetic cylinder 430 or vice versa. In "generator" mode, on the other hand, the movement of the coil assembly 500 relative to the toroidal magnetic cylinder 430 will cause current to be generated in the individual coils 526 to produce a DC current as the individual coils move through each tunnel or radial segment 420 or 421.

In order to maintain the generated torque and/or power the individual coils 526 in the coil assembly 500 may be selectively energized or activated by way of a switching or controller (not shown). The individual coils 526 in the coil assembly 500 may be electrically, physically, and communicatively coupled to switching or controller which selectively and operatively provides electrical current to the individual coils in a conventional manner.

For instance, the controller may cause current to flow within an individual coil 526 when the individual coil is within a magnetic tunnel segment 420 with a NNNN magnetic pole configuration as illustrated in FIG. 7D. On the other hand, when the same individual coil rotates into an adjacent magnetic tunnel segment 421 with a SSSS magnetic pole configuration, the controller causes the current within the individual coil 526 to flow in a direction opposite to that when the coil was in the NNNN magnetic pole segment 420 so that the generated magnetic force is in the same direction as coil rotates from one adjacent magnetic segment to the other.

As discussed above, the individual coils 526 may use toroidal winding without end windings and in some embodiments, the individual coils may be connected to each other in series. In other embodiments, a multi-phasic winding arrangement such as six phase, three phase, etc. winding connection may be used where the proper coils 526 are connected together to form a branch of each phase. For instance, two adjacent coils may be phase A coils, the next two adjacent coils may be phase B coils, and the next two adjacent coils may be phase C coils. This three phase configuration would then repeat for all individual coils 526 within the coil assembly 500. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the multi-phasic winding can produce a rotating magnetomotive force in the air gap around the coil assembly 500. The rotating magnetomotive force interacts with the magnetic field generated by the toroidal magnetic tunnel 430, which in turn produces torque on all sides of the coil assembly 500 and relative movement between the coil assembly and the toroidal magnetic tunnel.

In such embodiments, the individual coils 526 may be connected to a brushless motor controller (not shown) to be activated by a controller or in a similar manner known in the art. For each phase, the motor controller can apply forward current, reverse current, or no current. In operation, the motor controller applies current to the phases in a sequence that continuously imparts torque to turn the magnetic toroidal tunnel in a desired direction (relative to the coil assembly) in motor mode. In certain embodiments, the motor controller can decode the rotor position from signals from position sensors or can infer the rotor position based on back-emf produced by each phase. In certain embodiments, two controllers may be used. In other embodiments, a single controller may be used. The controller(s) controls the application of current of the proper polarity for the proper amount of time at the right time and controls the voltage/current for speed control. Regardless, the controllers allow for a switching action and a varying voltage action.

In other embodiments, a brushed motor/generator may be used. In such embodiments, one or more commutators (not shown) may be used and positioned, for instance, within the rotor hub 300 (see FIG. 1A). In certain embodiments, the number of brushes used may equal the number of toroidal magnetic segments used in the design of the particular motor/generator. For instance, if eight toroidal magnetic segments are used, then eight brushes may be used. The individual coils 526 in the coil assembly 500 may be connected in series having toroidal wound windings. In a brushed design in motor mode, a simplified reverse switching circuit is all that is necessary to switch the current direction as the coils enter and exit the respective toroidal magnetic segment.

A Multi-Layer Coil Assembly Embodiment:

An alternative embodiment is illustrated in FIGS. 9 through 17. In this embodiment, the coil assembly support 502 of previous embodiments has been replaced with a first coil assembly support 1502*a* and a second coil assembly support 1502*b*. In the present example, the coil assembly supports 1502*a* and 1502*b* form part of a stator, but in other embodiments they may form part of a rotor.

For brevity and clarity, a description of those parts which are identical or similar to those described in connection with the embodiments illustrated in FIGS. 1A through 8 will not be repeated here. Reference should be made to the foregoing paragraphs with the following description to arrive at a complete understanding of this alternative embodiment.

Figure 9:
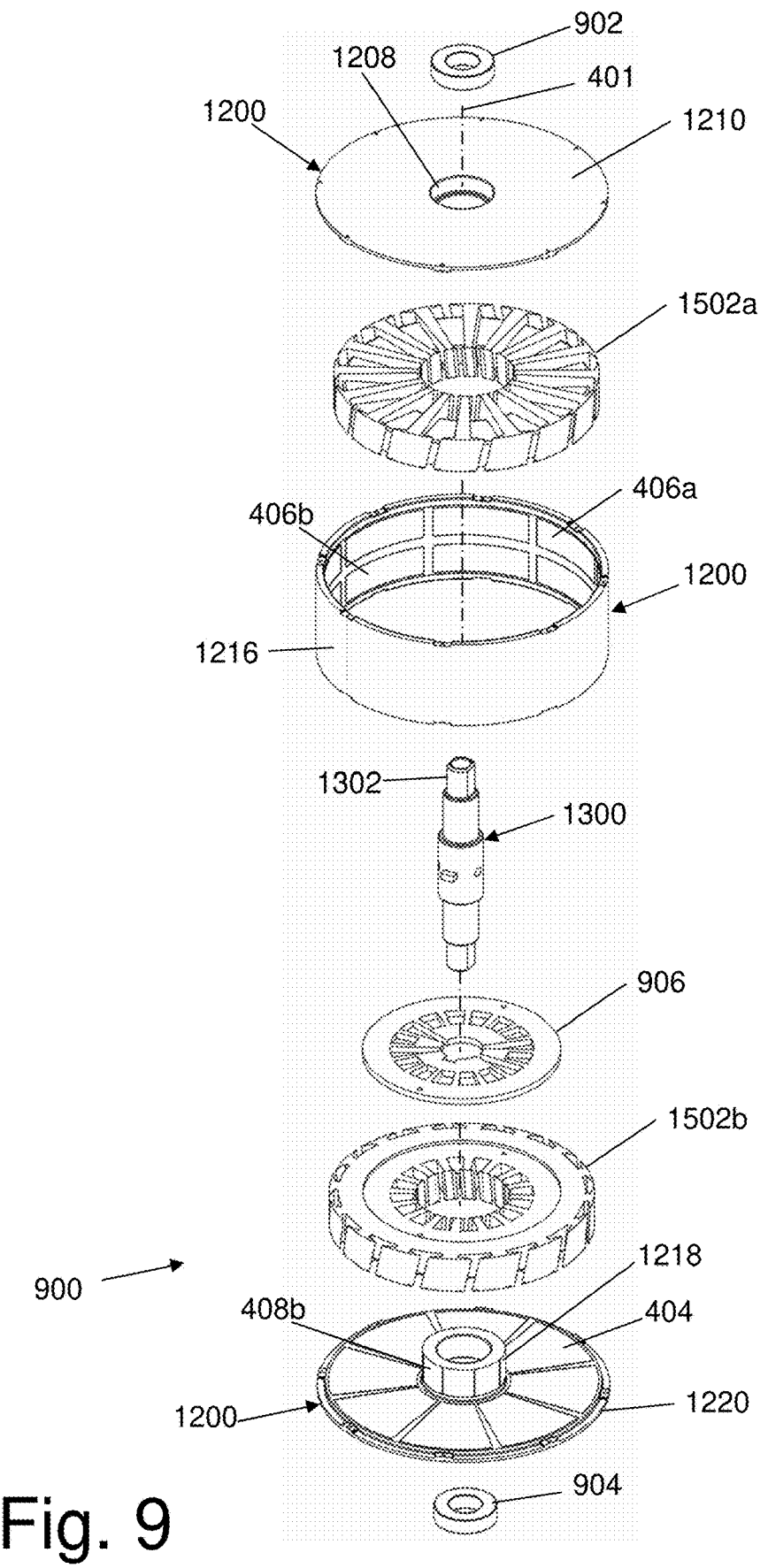
FIG. 9 is an exploded perspective view of an alternative embodiment of an electric motor/generator.
Figure 10:
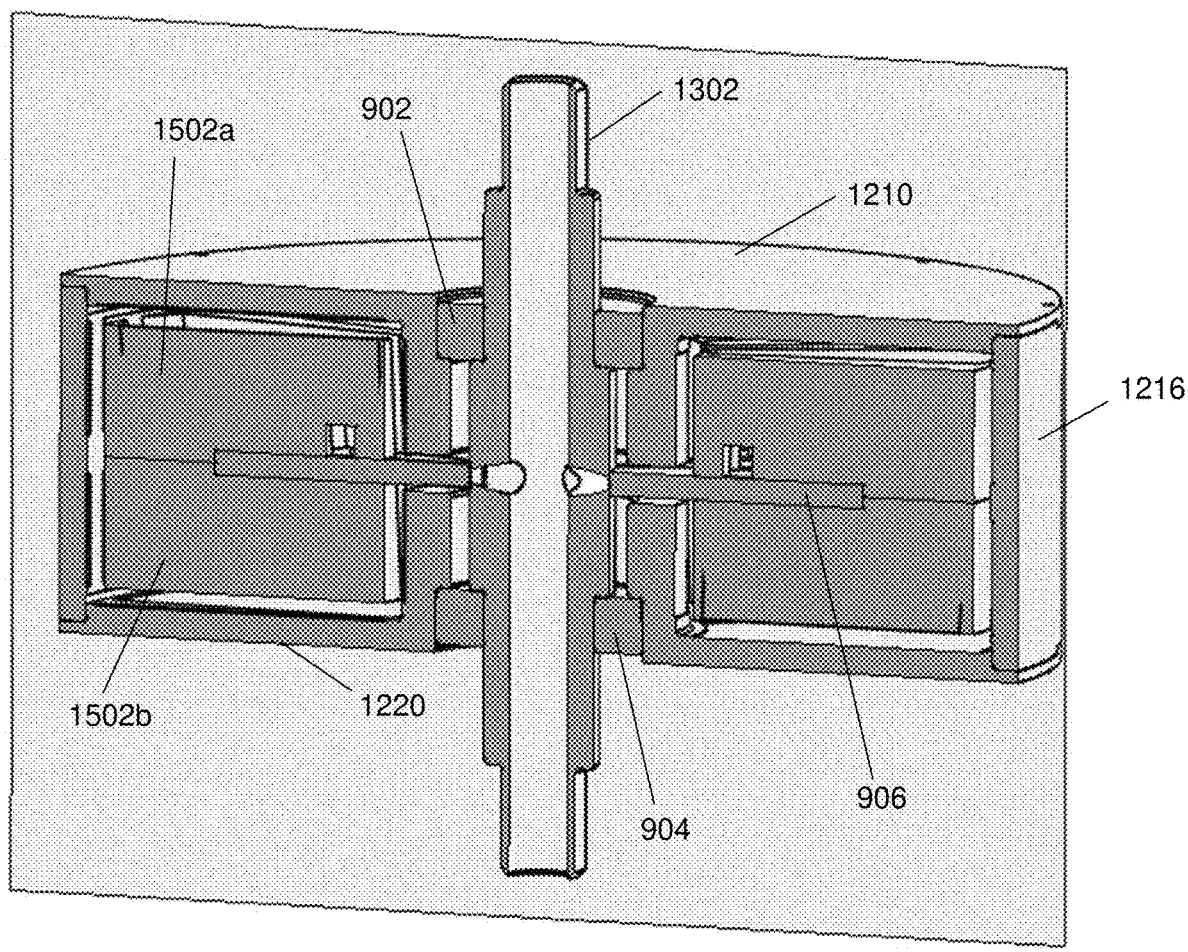
FIG. 10 is an assembled section view of the alternative embodiment of FIG. 9.

FIG. 9 is an exploded perspective view of the motor/generator 900. In contrast, FIG. 10 is a section view of the assembled motor/generator 900. As illustrated in FIGS. 9 and 10, a back iron circuit 1200 comprises a first flat side wall 1210, an outer cylindrical wall 1216, and a second flat side wall 1220. A first inner cylindrical wall 1208 and a second inner cylinder wall 1218 are concentrically positioned within the outer cylindrical wall 1206. As described previously, the coil assembly 1500 may move relative to a magnetic tunnel formed by magnets that are coupled to or otherwise positioned proximate to the walls of the back iron circuit 1200. In this embodiment, the coil assembly 1500 comprises a first coil assembly support 1502*a* and a second coil assembly support 1502*b*. Longitudinally positioned between the first coil assembly 1502*a* and the second coil assembly 1502*b* is a locking disc 906 which surrounds a shaft 1302. In certain embodiments, the locking disc 906 is used to couple the coil assembly supports 1502*a* and 1502*b* to a shaft 1302 of a rotor assembly 1300. Bearings 902 and 904 interact with the shaft 1302 and laterally support the shaft 1302 while allowing the shaft to rotate with respect to the back iron circuit 1200.

Although two coil assembly supports 1502*a* and 1502*b* and a single locking disc 906 are illustrated, other embodiments employ multiple coil assemblies and multiple locking discs. For instance in alternative embodiments, three coil assemblies may be used with two locking discs. Such embodiments are still within the scope of the present invention and the claims.

In certain embodiments, the individual coil assembly supports 1502*a* and 1502*b* may be formed from pressing a powdered metal into the appropriate shaped mold. For instance, powered metals, such as Somaloy 7003P, may be pressed at a high pressure to form the coil assembly supports 1502*a* and 1502*b*. Once the segment is pressed, the segment is heat-treated in a nitrogen steam environment which causes the resin coatings on the powdered metal to be oxygenated together and provides strength for the segment. Thus, there is an external layer on the particles that are then oxidized together. After heat treatment, any remaining slag can be removed by sandblasting or other techniques known in the art.

Using such powdered metal provides an electrically resistant material because each particle is essentially coated with an insulating or oxidized material. In other embodiments, iron particles may be mixed with a low melting point epoxy. In such an environment, once the iron/epoxy solution is heated (e.g., 105 degrees), the epoxy turns to liquid and the applied pressure can bleed the epoxy out of the mold—leaving almost pure iron. Using multiple coil assembly supports made from powdered metals may make fabrication of the coil supports easier.

In yet, other embodiments, the coil assembly supports 1502*a* and 1502*b* may be made of laminated metal. When using laminated metal, the flux can be controlled as the flux will only enter from a direction that is in parallel to the laminations and not transverse to the laminations. Thus, it is possible to specifically control the flux path based on the orientation of the laminations. It is also possible to turn off different areas of the lamination to obtain specific control for the flux path. Turning back to FIG. 4B, for instance, it is possible that the pole portions 510, 512, 514 and 516 be made of laminated sections where the laminations are parallel to the of the pole. The flux will then easily flow to or from the center or core 504 of the segment. On the other hand, if the yoke or core protrusion 504 was also made of laminated metal with the laminations running parallel to the face of the pole or tooth, the flux would not flow easily through the core or yoke. In other embodiments, the laminations could either end at the yoke or be bent so that the laminations going through the yoke run in a circumferential direction. An individual tooth of coil assembly supports 1502*a* and 1502*b* are similar to the segment illustrated in FIG. 4B except the illustration in FIG. 4B uses a single support where two supports are used in the alternative embodiment.

Figure 11:
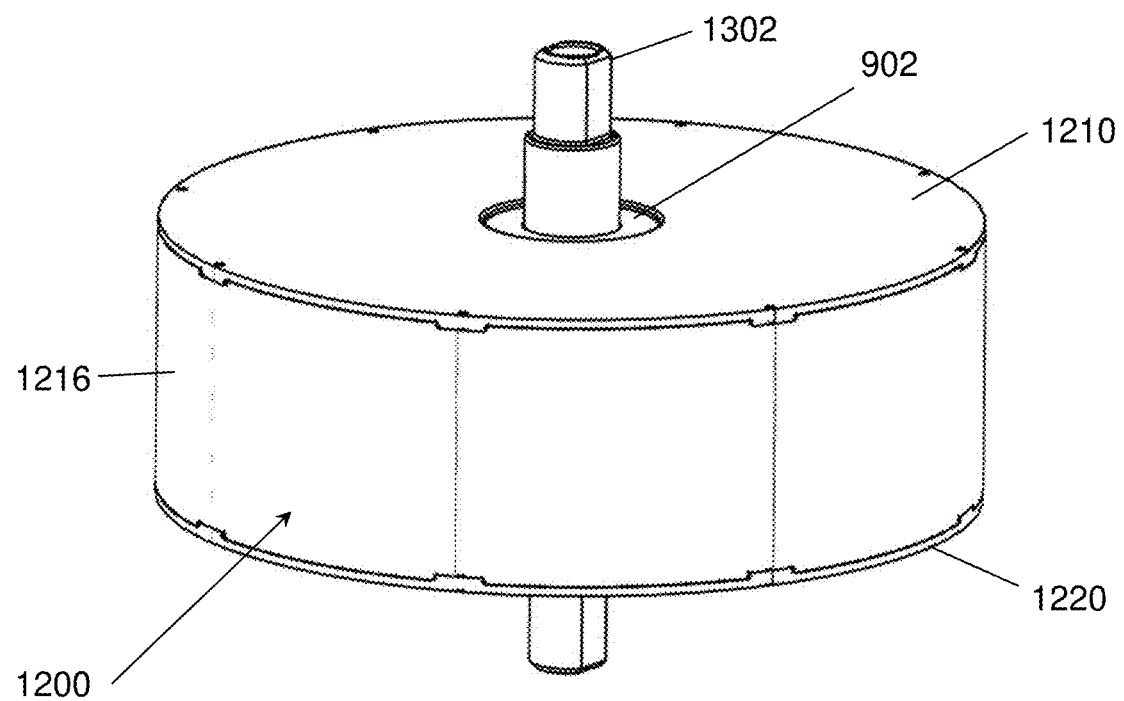
FIG. 11 is an assembled perspective view of the alternative embodiment of FIG. 9.

FIG. 11 is a perspective view illustrating the components of FIGS. 9 and 10 in assembled form. When assembled, the coil assembly 1500 (not shown) is enclosed within the back iron circuit 1200. As shown in FIG. 10, walls 1210, 1216, and 1220 are visible, as is the shaft 1302 and the bearing 902.

Figure 12A:
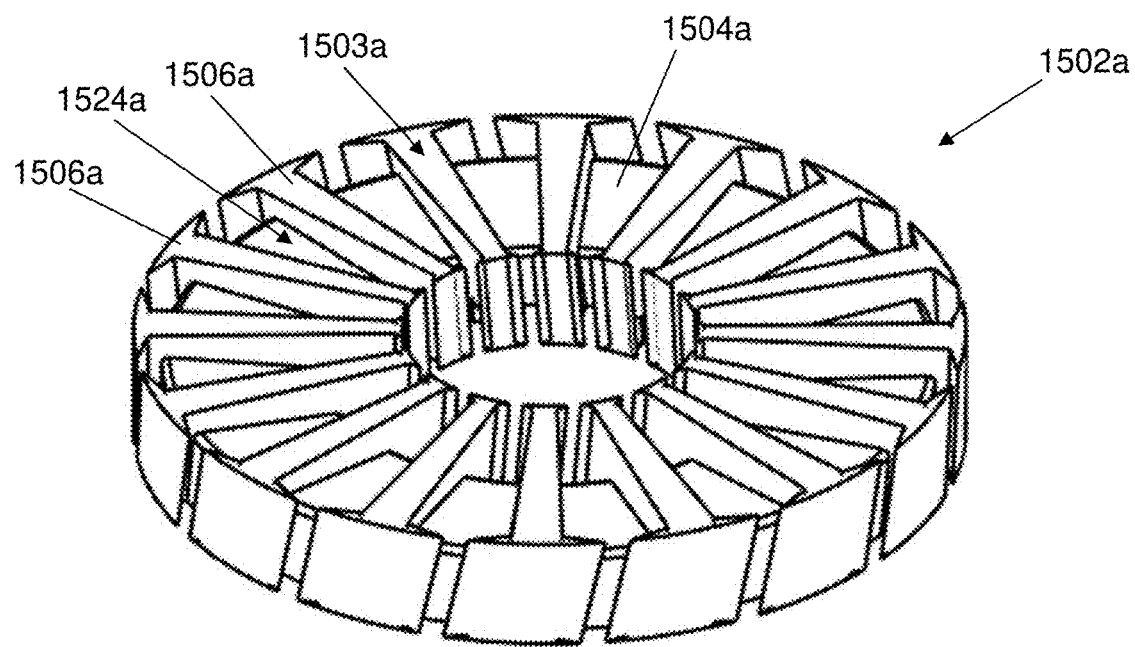
FIGS. 12A and 12B are perspective views of opposing sides of a first coil assembly support which may be used in certain embodiments of the alternative embodiment.
Figure 12B:
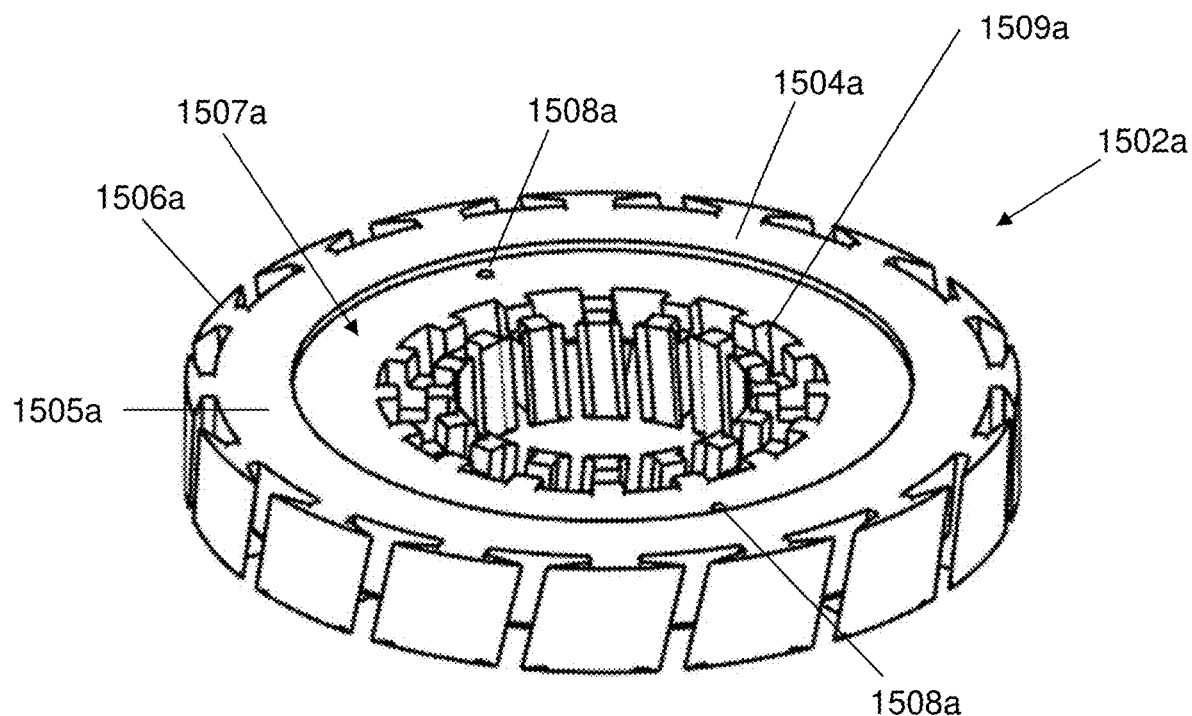

FIG. 12A is a perspective view of an exterior side 1503*a* of the coil assembly support 1502*a* from an exterior or upper perspective. FIG. 12B is a perspective view of an interior or opposing side 1505*a* of the coil assembly support 1502*a*. When assembled, the interior side 1505*a* faces the locking disc 906 (not shown) and the opposing coil assembly support 1502*b* (not shown in FIG. 12B). Similarly, when assembled, the exterior side 1503*a* faces the flat side wall 1210 (not shown in FIG. 12A) of the back iron circuit 1200. Multiple adjacent teeth 1506*a* project from and are supported by a core 1504*a* to form radial slots 1524*a* in a manner similar to that previously described in FIGS. 4A-4D.

The interior side 1505*a* may include an indentation 1507*a* with a diameter sized to receive the locking disc 906 when assembled, as will be described below in greater detail. The interior side 1505*a* may also include one or more protrusions, slots, and/or other engagement mechanisms 1508*a* to engage the locking disc 906. The one or more protrusions and/or slots 1508*a* may also serve to align the coil assembly support 1502*a* with the locking disc 906, which in turn may aligned with the coil assembly support 1502*b*. A similar alignment mechanism on coil assembly support 1502*b* enables the locking disc 906 to be used to align the coil assembly support 1502*a* with the coil assembly support 1502*b*. A circular recess 1509*a* defined within the interior tooth portion of the coil assembly support 1502 allows for the passage of electrical conducts and wires which may then be coupled to an interior space within the shaft 1302.

Figure 13A:
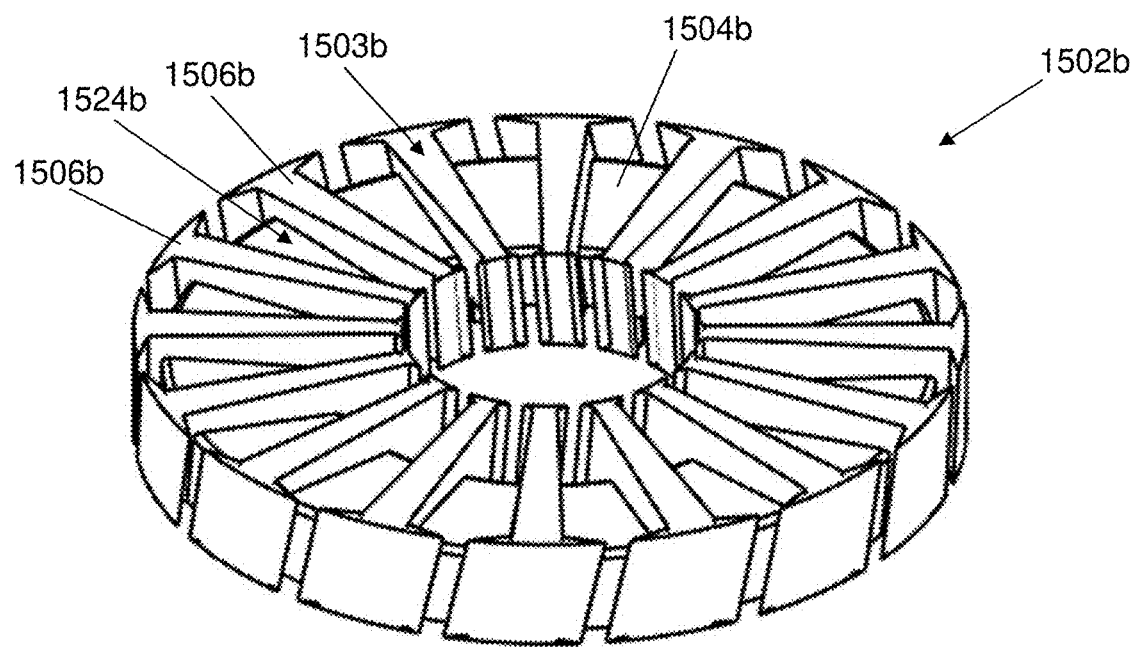
FIGS. 13A and 13B are perspective views of opposing sides of a second coil assembly support which may be used in certain embodiments of the alternative embodiment.
Figure 13B:
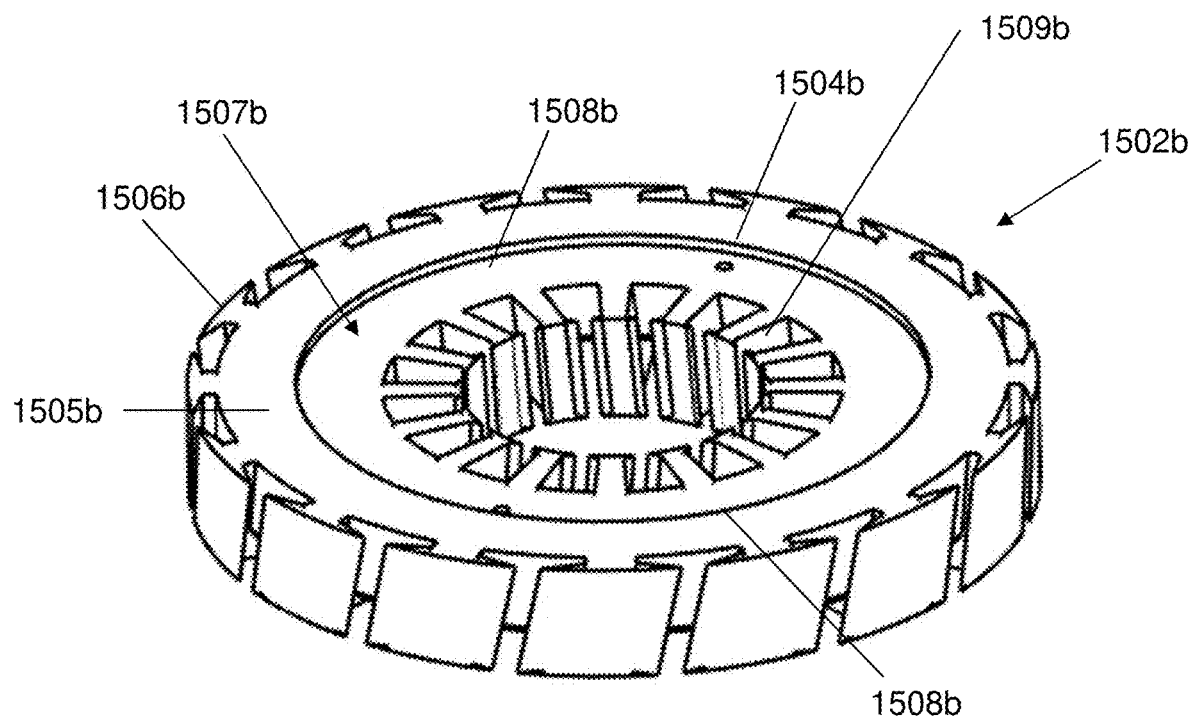

FIG. 13A is a perspective view of an exterior side 1503*b* of the coil assembly support 1502*b* from an exterior or upper perspective. FIG. 13B is a perspective view of an interior or opposing side 1505*b* of the coil assembly support 1502*a*. When assembled, the interior side 1505*b* faces the locking disc 906 (not shown) and the opposing coil assembly support 1502*b* (not shown in FIG. 13B). Similarly, when assembled, the exterior side 1503*b* faces the flat side wall 1210 (not shown in FIG. 13A) of the back iron circuit 1200. Multiple adjacent teeth 1506*b* project from and are supported by a core 1504*b* to form radial slots 1524*b* in a manner similar to that previously described in FIGS. 4A-4D.

The interior side 1505*b* may include an indentation 1507*b* with a diameter sized to receive the locking disc 906 when assembled, as will be described below in greater detail. The interior side 1505*b* may also include one or more protrusions, slots, and/or other engagement mechanisms 1508*b* to engage the locking disc 906. The one or more protrusions and/or slots 1508*b* may also serve to align the coil assembly support 1502*b* with the locking disc 906, which in turn may aligned with the coil assembly support 1502*b*. As discussed above, a similar alignment mechanism on coil assembly support 1502*a* enables the locking disc 906 to be used to align the coil assembly support 1502*a* with the coil assembly support 1502*b*.

Figure 14:
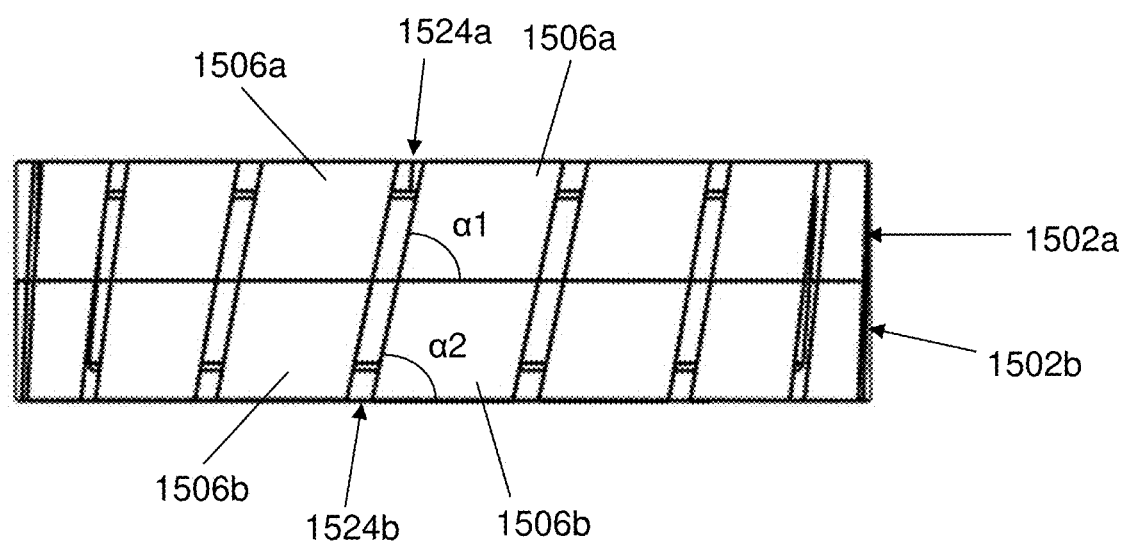
FIG. 14 is a side view of the first coil assembly support of FIGS. 12A and 12B aligned with the second coil assembly support of FIGS. 13A and 13B.

FIG. 14 is a side view illustrating one embodiment of the coil assembly supports 1502*a* and 1502*b* positioned in their assembled form. As shown, the two coil assembly supports 1502*a* and 1502*b* provide two layers that are positioned together to form a single coil assembly 1500, although they have separate teeth, cores, and other components as described above.

In the illustrated embodiment, outer walls of the teeth 1506*a* and 1506*b* may be angled as shown, with the teeth 1506*a* of the coil assembly support 1502*a* having an angle of α1 and the teeth 1506*b* of the coil assembly support 1502*b* having an angle of α2. The angles α1 and α2 may or may not be identical, and different teeth within a single coil assembly support may have identical or different angles. When α1 and α2 are identical, the teeth 1506*a* and 1506*b* may be aligned as shown to provide a single edge profile with an angle of α1. In some embodiments, the teeth 1506*a* and 1506*b* may be offset to produce a field weakening effect.

Figure 15:
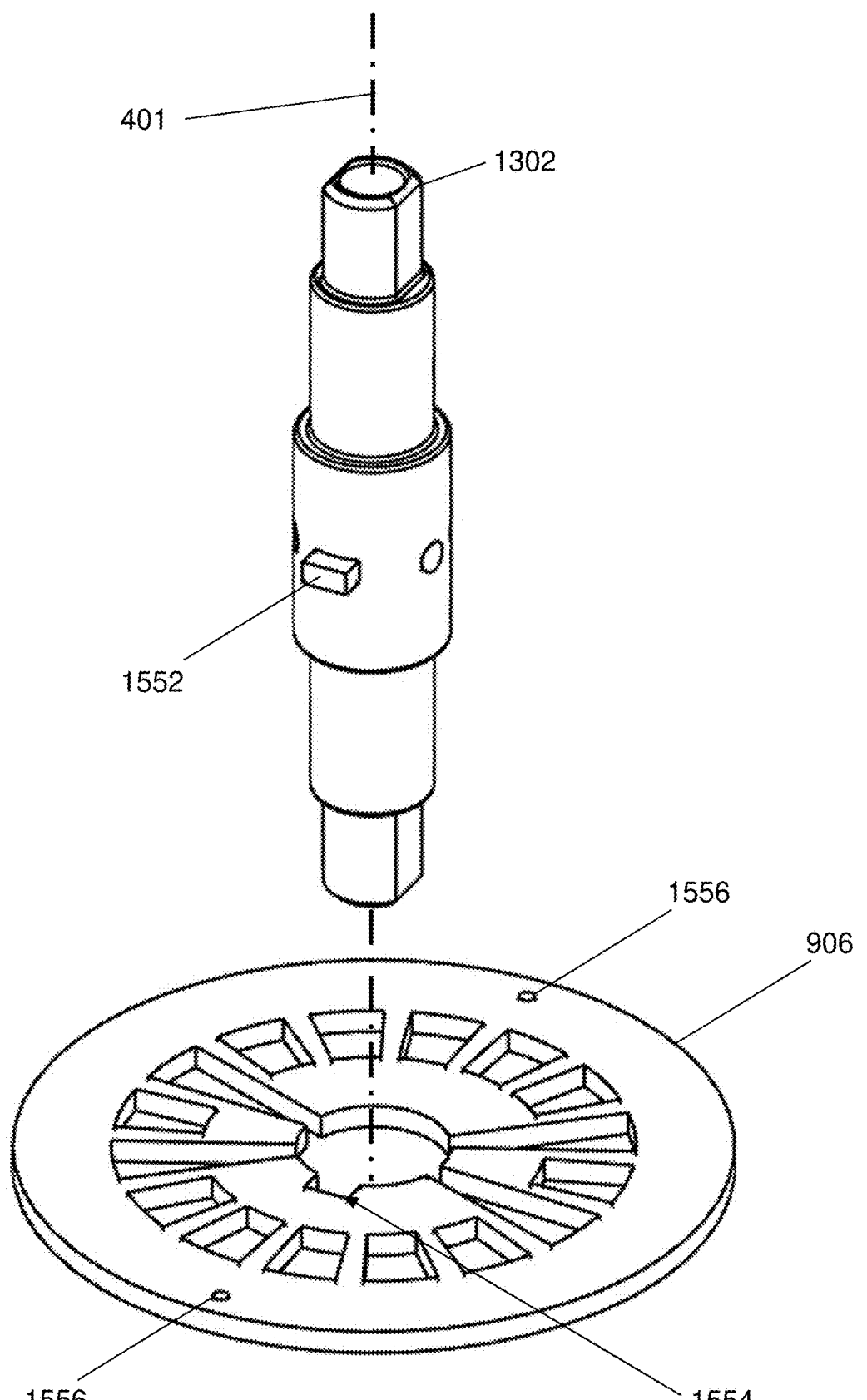
FIG. 15 is an isometric exploded view of various components of FIG. 9 illustrating portions of a shaft and a locking disc aligned with the shaft.

FIG. 15 is a detailed perspective view of the shaft 1302 and the locking disc 906. In the illustrated example, the shaft 1302 includes a protrusion 1552 that is sized to engage a slot 1554 in the locking disc 906. It is understood that any combination of protrusions, slots, and/or other engagement mechanisms may be used, and that a particular protrusion or slot may be positioned on the shaft 1302 or the locking disc 906. When engaged, the combination of the protrusion 1552 and slot 1554 prevents rotational movement of the shaft 1302 relative to the locking disc 906. This means that movement of the shaft 1302 will result in a corresponding movement of the locking disc 906, and movement of the locking disc 906 will result in a corresponding movement of the shaft 1302.

In the illustrated configuration, the axial position of the locking disc 906 relative to the shaft 1302 along the longitudinal axis 401 should be restricted to prevent the protrusion 1552 from slipping from the slot 1554. This axial movement restriction may be accomplished by the coil assembly supports 1502*a* and 1502*b*. As described below, the locking disc 906 is positioned between the coil assembly supports 1502*a* and 1502*b*, and may include one or more protrusions, slots, and/or other engagement mechanisms 1556 that enable the locking disc 906 to engage a coil assembly support 1502*a*/1502*b*.

Figure 16:
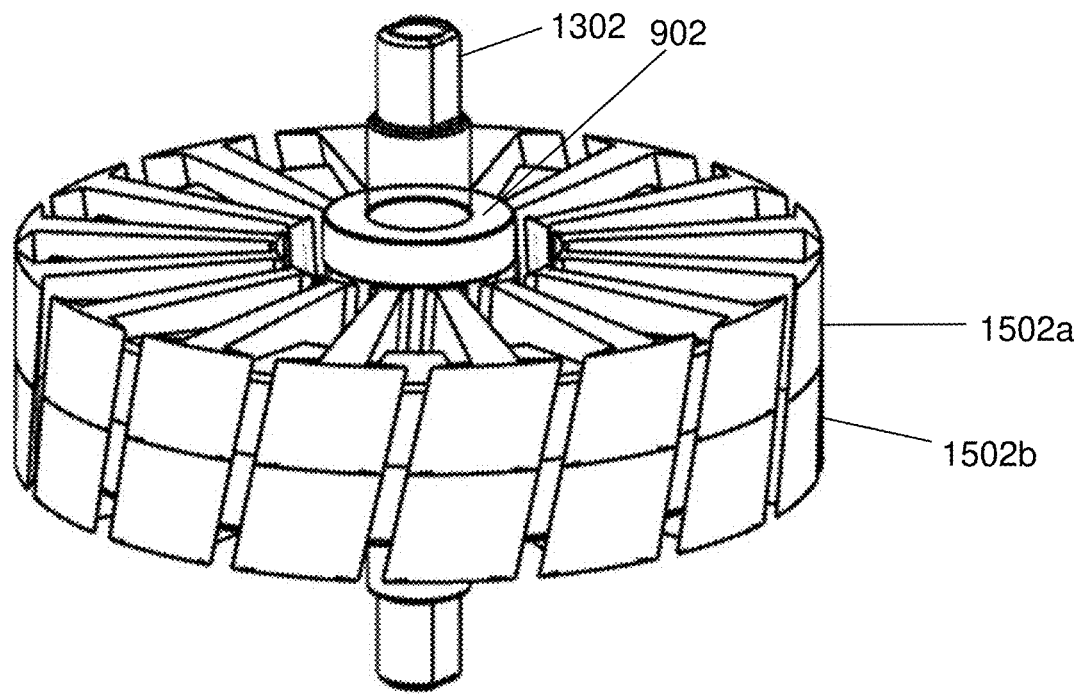
FIG. 16 is a perspective view of the coil assembly portions of FIGS. 12A, 12B, 13A, and 13B coupled to a shaft.
Figure 17:
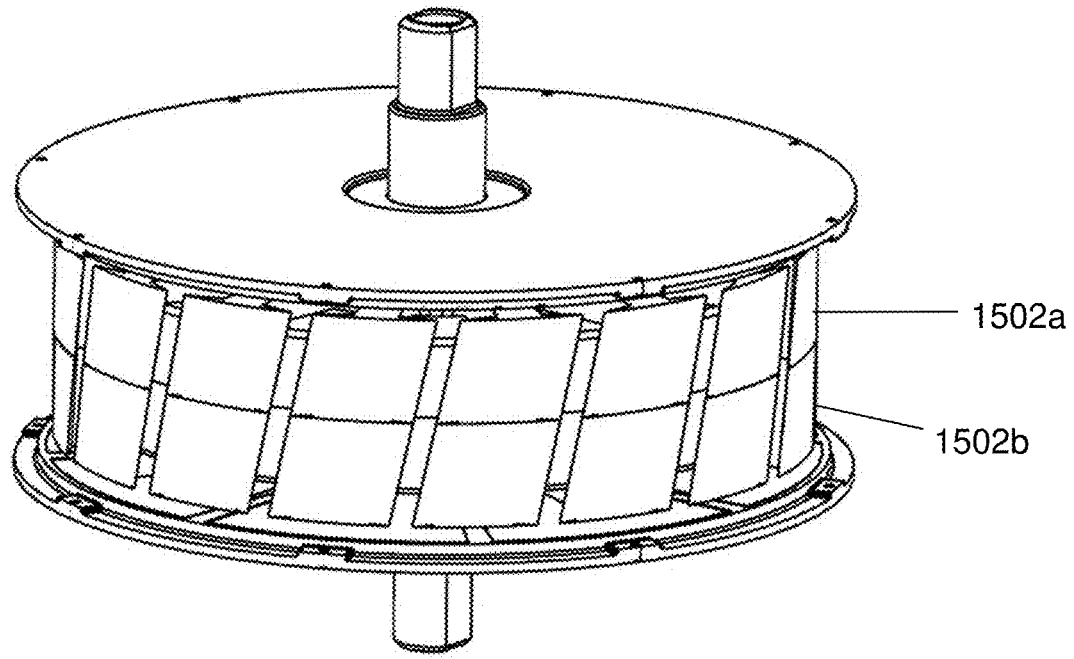
FIG. 17 is a perspective view of the coil assembly portion of FIG. 16 with the addition of certain components of a back iron circuit.

FIG. 16 is a perspective view showing the coil assembly supports 1502*a* and 1502*b* coupled together with the shaft 1302 and coupled to a bearing 902. In contrast, FIG. 17 illustrates the view of FIG. 16 but with the addition of the side walls 1210 and 1220 of the back iron circuit. In the present example, the coil assembly supports 1502*a* and 1502*b* are stacked in an adjacent manner to form two abutting layers.

Referring back to FIG. 10, note the locking disc 906 is sized to fit into the indentation 1507*a* of the interior surface 1505*a* of the first coil assembly support 1502*a* (FIG. 12B). Similarly, the locking disc 906 is also sized to fit into the indentation 1507*b* of the interior surface 1505*b* of the second coil assembly support 1502*b* (FIG. 13B). The one or more protrusions/slots 1556 on the locking disc 906 may engage the protrusions/slots 1508*a* and 1508*b*, respectively, on the coil assembly supports 1502*a* and 1502*b*. This engagement between the coil assembly supports 1502*a* and 1502*b* and the locking disc 906 prevents rotational movement of the coil assembly supports 1502*a* and 1502*b* relative to the locking disc 906. Accordingly, this engagement means the coil assembly supports 1502*a* and 1502*b* will rotate with the locking disc 906 and, in turn, with the shaft 1302. This enables the coil assembly 1500 to rotate within the magnetic tunnels as previously described above with respect to the previous embodiments. In addition, the coil assembly supports 1502*a* and 1502*b* prevent the locking disc 906 from moving axially along the shaft 1302.

The thickness of the locking disc 906 may vary and its thickness relative to the depths of the indentations 1507*a* and 1507*b* may determine the closeness of the interior sides 1505*a* and 1505*b*. For example, if each indentation 1507*a* and 1507*b* is half of the height of the locking disc 906, the two interior sides 1505*a* and 1505*b* will be in contact or almost in contact. In alternative embodiments, a thicker locking disc 906 or shallower indentations 1507*a* and 1507*b* will force the interior sides 1505*a* and 1505*b* apart.

It is understood that many other embodiments are encompassed by the present disclosure. For example, in one embodiment, there may be two or more locking discs. In another embodiment, there may be a locking disc positioned on an exterior side of a coil assembly support. In still another embodiment, there may be no locking disc and each coil assembly support may be coupled directly to the shaft. In yet another embodiment, one coil assembly support may be coupled directly to the shaft and to the other coil assembly support that is not coupled directly to the shaft. In another embodiment, there may be more than two coil assembly supports, which may be rotationally coupled to the shaft directly, using one or more locking discs, or using some other engagement mechanism or combination of engagement mechanisms.

Additionally, undescribed embodiments which have interchanged components are still within the scope of the present invention. It is intended that the scope of the invention be limited not by this detailed description, but rather by the claims or future claims supported by the disclosure.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112(f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC 112(f).

The invention claimed is:

1. A system for an electric motor comprising:
a toroidal magnetic cylinder arranged about a motor axis, the toroidal magnetic cylinder formed by:
an outer cylindrical magnetic wall;
an inner cylindrical magnetic wall concentrically positioned within the outer cylindrical magnetic wall;
a first side magnetic wall positioned adjacent to one end of the outer cylindrical magnetic wall and to one end of the inner cylindrical magnetic wall;
a second side magnetic wall positioned adjacent to an opposing end of the outer cylindrical magnetic wall and to an opposing end of the inner cylindrical magnetic wall; and
a coil assembly including:
a first coil assembly support positioned within the toroidal magnetic cylinder, the first coil assembly support comprising a first circular core centered on the motor axis, and a first circular indention formed on a first side of the first circular core;
a second coil assembly support positioned within the toroidal magnetic cylinder, the second coil assembly support comprising a second circular core centered on the motor axis, and a second circular indention formed on a second side of the second circular core facing the first side of the first circular core to form a cavity; and
a set of coils angularly arranged about the first circular core and the second circular core; and
a locking disc:
arranged about the motor axis;
nested within the cavity of the coil assembly;
coupling the first coil assembly support to the second coil assembly support; and
comprising a shaft coaxial the motor axis and extending outwardly from the toroidal magnetic cylinder.

2. The system of claim 1:
wherein the first coil assembly support comprises the first circular core:
radially arranged about the motor axis; and
comprising a first set of teeth positioned radially about the first circular core and defining a first set of interstices about the first circular core;
wherein the second coil assembly support comprises the second circular core:
radially arranged about the motor axis; and
comprising a second set of teeth, in alignment with the first set of teeth about the first circular core, positioned radially about the second circular core and defining a second set of interstices about the second circular core;
wherein the set of coils comprises:
a first subset of windings coiled about the first set of interstices of the first coil assembly support; and
a second subset of windings coiled about the second set of interstices of the second coil assembly support; and
wherein the locking disc:
is interposed between the first coil assembly support and the second coil assembly support; and
couples the first subset of windings of the first circular core in alignment with the second subset of windings of the second circular core.

3. The system of claim 1:
wherein the first coil assembly support comprises a first protrusion arranged on the first indentation; and
wherein the locking disc comprises a slot:
coupling the first protrusion on the first coil assembly support; and
configured to rigidly couple the locking disc to the first coil assembly support and locate the locking disc within the cavity of the coil assembly.

4. The system of claim 1, further comprising a controller configured to generate magnetic field tunnel by driving current through the set of coils that sequentially and magnetically couples the outer cylindrical magnetic wall, the inner cylindrical magnetic wall, the first side magnetic wall, and the second side magnetic wall to rotate the coil assembly and the shaft.

5. A system for an electric motor comprising:
a coil assembly:
comprising:
a first set of windings radially arranged about a motor axis; and
a second set of windings, opposite the first set of windings, radially arranged about the motor axis;
defining an inner radial facet, an outer radial facet, a first axial facet, and a second axial facet opposite the first axial facet; and
defining a cavity interposed between the first set of windings and the second set of windings;
a locking disc:
nested within the cavity of the coil assembly;
coupling the first set of windings to the second set of windings; and
comprising a shaft coaxial with the motor axis coupled to the locking disc;
a set of magnetic elements:
encompassing the inner radial facet, the outer radial facet, the first axial facet, and the second axial facet of the coil assembly;
defining a radial magnetic tunnel about the motor axis; and
configured to generate a flux density distribution focused toward the coil assembly; and
a controller configured to drive current through the first set of windings and the second set of windings to generate a magnetic field tunnel that sequentially and magnetically couples the set of magnetic elements contained within the support structure to rotate the coil assembly.

6. The system of claim 5:
wherein the coil assembly comprises:
an upper coil support comprising:
the first set of windings radially arranged about the upper coil support;
a first indentation arranged on a bottom face of the upper coil support; and
a first coupling member arranged on the first indentation;
a lower coil support comprising:
the second set of windings radially arranged about the lower coil support;
a second indentation arranged on a top face of the lower coil support opposite the bottom face of the upper coil support to form the cavity; and a second coupling member arranged on the second indentation; and
wherein the locking disc:
is interposed between the upper coil support and the lower coil support; and
couples the first coupling member of the first coil support and the second coupling member of the second coil support to rigidly connect the first coil support and the second coil support.

7. The system of claim 6:
wherein the locking disc further comprises a slot arranged at an inner radial of the locking disc;
wherein the shaft comprises a protrusion:
arranged at an outer surface of the shaft; and
configured to couple the slot of the locking disc to rigidly couple the shaft to the first coil support and the second coil support.

8. The system of claim 5:
wherein the coil assembly comprises:
a first coil support:
comprising a first set of teeth positioned radially about the first coil support and defining a first set of interstices about the first coil support; and
comprising the first set of windings coiled about the first set of interstices;
a second coil support:
comprising a second set of teeth, in alignment with the first set of teeth about the first coil support, positioned radially about the second coil support and defining a second set of interstices about the second coil support; and
comprising the second set of windings, in alignment with the first set of windings, coiled about the second set of interstices; and
wherein the locking disc is interposed between the first coil support and the second coil support and locates the first set of windings in alignment with the second set of windings.

9. The system of claim 8:
wherein the first set of teeth comprises:
a first tooth:
coupled to the first coil support; and
comprising a first set of fins about the first tooth; and
a second tooth:
coupled to the first coil support;
radially offset from the first tooth; and
defining a second set of fins arranged about the second tooth and cooperating with the first set of fins of the first tooth to define a first radial slot about the first coil support; and
wherein the first set of windings comprises a first winding coiled about the first radial slot interposed between the first tooth and the second tooth.

10. The system of claim 5:
wherein the coil assembly comprises:
a first circular core comprising:
a first set of teeth arranged at a first angle about a first circular core; and
the first set of windings arranged about the first set of teeth; and
a second circular core:
arranged below the first circular core;
comprising a second set of teeth arranged at a second angle, different from the first angle, about the second circular core; and
comprising the second set of windings arranged about the second set of teeth; and
wherein the locking disc:
is interposed between the first circular core and the second circular core; and
locates the first set of teeth offset from the second set of teeth to generate a field weakening effect.

11. The system of claim 5, wherein the set of magnetic elements comprises:
a first subset of axial magnetic elements arranged in a radial pattern about the first axial facet of the coil assembly;
a second subset of axial magnetic elements arranged in a radial pattern about the second axial facet, opposite the first axial facet, of the coil assembly;
a subset of inner radial magnetic elements arranged in a radial pattern about the inner radial facet of the coil assembly; and
a subset of outer radial magnetic elements arranged in a radial pattern about the outer radial facet of the coil assembly and cooperating with the first subset of axial magnetic elements, the second subset of axial magnetic elements, and the subset of inner radial magnetic elements to form the radial magnetic tunnel.

12. The system of claim 5:
wherein the locking disc rigidly couples the shaft to the coil assembly to define a rotor of the electric motor; and
wherein the controller is configured to drive current through the first set of windings and the second set of windings to generate a magnetic field tunnel that:
sequentially and magnetically couples the set of magnetic elements; and
rotates the coil assembly and the shaft within the set of magnetic elements.

13. The system of claim 5:
wherein the coil assembly further comprises a first circular core comprising:
the first set of windings arranged radially about the first circular core; and
a first protrusion extending from a first face of the first circular core; and
wherein the locking disc:
is arranged below the first face of the first circular core;
defines a diameter less than a diameter of the first face of the first circular core; and
comprises a first slot coupling the first protrusion on the first face of the first circular core.

14. The system of claim 13:
wherein the coil assembly further comprises a second circular core, arranged opposite the first circular core, comprising:
the second set of windings arranged radially about the second circular core; and
a second protrusion extending from a second face of the second circular core opposite the first face of the first circular core; and
wherein the locking disc:
is arranged above the second face of the second circular core;
comprises a second slot, opposite the first slot, coupling the second protrusion on the second face of the second circular core; and
rigidly couples the shaft to the first circular core and the second circular core.

15. The system of claim 14, wherein the first circular core cooperates with the second circular core to enclose the locking disc within the cavity formed by the first circular core and the second circular core.

16. The system of claim 5, further comprising a back iron circuit comprising:
a first outer plate:
defining a first set of outer slots; and
comprising a first subset of axial magnetic elements, in the set of magnetic elements, arranged at the first set of outer slots and facing the first axial facet of the set of coil assemblies;
a second outer plate:
arranged opposite the first outer plate;
defining a second set of outer slots; and
comprising a second subset of axial magnetic elements, in the set of magnetic elements, arranged at the second set of outer slots and facing the second axial facet of the set of coil assemblies; and
an outer radial wall:
interposed between the first outer plate and the second outer plate;
defining a set of outer slots arranged about the outer radial wall; and
comprising a subset of outer radial magnetic elements, in the set of magnetic elements, arranged at the set of outer slots and facing the outer radial facet of the set of coil assemblies.

17. The system of claim 16, wherein the back iron circuit further comprises an inner rotor core:
arranged within an inner radius of the coil assembly;
defining a set of inner slots arranged about the inner rotor core;
comprising a subset of inner radial magnetic elements, in the set of magnetic elements, arranged at the set of inner slots and facing the inner radial facet of the set of coil assemblies; and
cooperating with the first outer plate, second outer plate, and outer radial wall to form the radial magnetic tunnel.

18. The system of claim 5, wherein the set of magnetic elements defines a first tunnel segment comprising:
a first magnetic element extending across the first axial facet of the coil assembly;
a first opposing magnetic element extending across the second axial facet, opposite the first axial facet, of the coil assembly;
a first inner radial magnetic element extending across the inner radial facet of the coil assembly; and
a first outer radial magnetic element:
radially offset from the first inner radial magnetic element;
extending across the outer radial facet of the coil assembly; and
cooperating with the first magnetic element, the first opposing magnetic element, and the first inner radial magnetic element to define a first magnetic pole orientation towards an interior of the first tunnel segment.

19. The system of claim 18, wherein the set of magnetic elements defines a second tunnel segment comprising:
comprising a second magnetic element:
adjacent the first magnetic element; and
extending across the first axial facet of the coil assembly;
a second opposing magnetic element:
adjacent the first opposing magnetic element; and
extending across the second axial facet, opposite the first axial facet, of the coil assembly;
a second inner radial magnetic element:
adjacent the first inner radial magnetic element; and
extending across the inner radial facet of the coil assembly; and
a second outer radial magnetic element:
adjacent the first outer radial magnetic element;
radially offset from the second inner radial magnetic element;
extending across the outer radial facet of the coil assembly; and
cooperating with the second side magnetic wall, second opposing side magnetic wall, and second inner magnetic wall to define a second magnetic pole orientation, different from the first magnetic pole orientation, towards an interior of the second magnetic tunnel segment.

20. A system for an electric motor comprising:
an upper coil support:
comprising a first set of windings radially arranged about a motor axis;
defining a first cavity inset from a first face of the first coil support;
a lower coil support:
comprising a second set of windings, aligned with the first set of windings, arranged about the motor axis; and
defining a second cavity inset from a second face of the second coil support cooperating with the first cavity of the first coil support to define a pocket;
a locking disc:
nested within the pocket formed by the upper coil support and the lower coil support;
coupling the first set of windings to the second set of windings; and
comprising a shaft coaxial with the motor axis coupled to the locking disc;
a set of magnetic elements:
encompassing an inner radial facet, an outer radial facet, a first axial facet, and a second axial facet of the coil assembly;
defining a radial magnetic tunnel about the motor axis; and
configured to generate a flux density distribution focused toward the coil assembly; and
a controller configured to drive current through the first set of windings and the second set of windings to generate a magnetic field tunnel that sequentially and magnetically couples the set of magnetic elements contained within the support structure to rotate the coil assembly.

* * * * *